(12) United States Patent
Bhavaraju et al.

(10) Patent No.: US 9,413,036 B2
(45) Date of Patent: Aug. 9, 2016

(54) SODIUM-HALOGEN SECONDARY CELL

(71) Applicant: Ceramatec, Inc., Salt Lake City, UT (US)

(72) Inventors: Sai Bhavaraju, West Jordan, UT (US); Mathew Robins, Saratoga Spring, UT (US); Alexis Eccelston, Salt Lake City, UT (US)

(73) Assignee: CERAMATEC, Inc., Salt Lake City, UT (US)

( * ) Notice: Subject to any disclaimer, the term of this patent is extended or adjusted under 35 U.S.C. 154(b) by 260 days.

(21) Appl. No.: 14/019,651

(22) Filed: Sep. 6, 2013

(65) Prior Publication Data
US 2014/0065456 A1    Mar. 6, 2014

Related U.S. Application Data

(60) Provisional application No. 61/697,608, filed on Sep. 6, 2012, provisional application No. 61/777,967, filed on Mar. 12, 2013, provisional application No. 61/781,530, filed on Mar. 14, 2013, provisional application No. 61/736,444, filed on Dec. 12, 2012.

(51) Int. Cl.
*H01M 2/38*    (2006.01)
*H01M 10/36*    (2010.01)
(Continued)

(52) U.S. Cl.
CPC .............. *H01M 10/36* (2013.01); *H01M 4/381* (2013.01); *H01M 4/388* (2013.01); *H01M 4/42* (2013.01); *H01M 4/587* (2013.01); *H01M 4/62* (2013.01); *H01M 8/188* (2013.01); *H01M 8/22* (2013.01); *H01M 10/054* (2013.01); *H01M 10/0562* (2013.01); *H01M 10/24* (2013.01); *H01M 10/39* (2013.01); *H01M 10/399* (2013.01);
(Continued)

(58) Field of Classification Search
None
See application file for complete search history.

(56) References Cited

U.S. PATENT DOCUMENTS 4,162,351 A * 7/1979 Putt ..................... H01M 10/36
                                                429/101
4,244,986 A    1/1981   Paruso et al.
(Continued)

FOREIGN PATENT DOCUMENTS

| JP | 62186470 | 8/1987 |
|----|----------|--------|
| JP | 2008293678 | 12/2008 |

(Continued)

OTHER PUBLICATIONS

Young, Lee W., "International Search Report", PCT Search Report for App. No. PCT/US 08/10435, (Nov. 25, 2008),1-2.

(Continued)

*Primary Examiner* — Patrick Ryan
*Assistant Examiner* — Jose Colucci Rios
(74) *Attorney, Agent, or Firm* — Paul S. Cha

(57) ABSTRACT

A sodium-halogen secondary cell that includes a negative electrode compartment housing a negative, sodium-based electrode and a positive electrode compartment housing a current collector disposed in a liquid positive electrode solution. The liquid positive electrode solution includes a halogen and/or a halide. The cell includes a sodium ion conductive electrolyte membrane that separates the negative electrode from the liquid positive electrode solution. Although in some cases, the negative sodium-based electrode is molten during cell operation, in other cases, the negative electrode includes a sodium electrode or a sodium intercalation carbon electrode that is solid during operation.

39 Claims, 22 Drawing Sheets

(51) Int. Cl.

| | | |
|---|---|---|
| *H01M 10/39* | (2006.01) | |
| *H01M 10/24* | (2006.01) | |
| *H01M 4/38* | (2006.01) | |
| *H01M 4/62* | (2006.01) | |
| *H01M 10/054* | (2010.01) | |
| *H01M 4/42* | (2006.01) | |
| *H01M 4/587* | (2010.01) | |
| *H01M 8/18* | (2006.01) | |
| *H01M 8/22* | (2006.01) | |
| *H01M 10/0562* | (2010.01) | |
| *H01M 12/08* | (2006.01) | |
| *H01M 4/66* | (2006.01) | |
| *H01M 10/42* | (2006.01) | |

(52) U.S. Cl.
CPC .............. *H01M12/08* (2013.01); *H01M 4/661* (2013.01); *H01M 10/4235* (2013.01); *H01M 2300/0071* (2013.01); *H01M 2300/0077* (2013.01)

(56) References Cited

U.S. PATENT DOCUMENTS

| | | | |
|---|---|---|---|
| 4,307,164 | A | 12/1981 | Church et al. |
| 4,375,501 | A | 3/1983 | Peled et al. |
| 4,427,747 | A | 1/1984 | Bennett et al. |
| 4,546,055 | A | 10/1985 | Coetzer et al. |
| 4,579,796 | A | 4/1986 | Muramatsu |
| 4,753,858 | A | 6/1988 | Jow et al. |
| 5,139,897 | A | 8/1992 | Wedlake |
| 5,264,298 | A | 11/1993 | Townsend |
| 5,290,405 | A | 3/1994 | Joshi et al. |
| 5,422,197 | A | 6/1995 | Zito |
| 5,525,442 | A | 6/1996 | Shuster |
| 5,552,244 | A | 9/1996 | Griffin et al. |
| 5,563,006 | A | 10/1996 | Von Benda et al. |
| 5,686,201 | A | 11/1997 | Chu |
| 6,030,720 | A | 2/2000 | Chu et al. |
| 6,033,343 | A | 3/2000 | Licht |
| 6,376,123 | B1 | 4/2002 | Chu |
| 6,410,181 | B1 | 6/2002 | Spillman et al. |
| 6,852,450 | B2 | 2/2005 | Hwang et al. |
| 6,881,234 | B2 | 4/2005 | Towsley |
| 8,012,621 | B2 | 9/2011 | Joshi et al. |
| 8,883,339 | B2 | 11/2014 | Choi |
| 8,968,902 | B2 | 3/2015 | Coors et al. |
| 2002/0150818 | A1 | 10/2002 | Amatucci et al. |
| 2002/0172871 | A1 | 11/2002 | Schucker |
| 2004/0065543 | A1 | 4/2004 | Kovarsky |
| 2005/0109617 | A1 | 5/2005 | Ono et al. |
| 2005/0260460 | A1 | 11/2005 | Kishi et al. |
| 2006/0141346 | A1 | 6/2006 | Gordon et al. |
| 2006/0177732 | A1 | 8/2006 | Visco et al. |
| 2006/0226022 | A1 | 10/2006 | Balagopal et al. |
| 2006/0257734 | A1 | 11/2006 | Obata et al. |
| 2007/0048610 | A1 | 3/2007 | Tsang et al. |
| 2007/0154762 | A1 | 7/2007 | Schucker |
| 2007/0221265 | A1 | 9/2007 | Affinito et al. |
| 2008/0268327 | A1* | 10/2008 | Gordon ............... H01M 2/1646 429/50 |
| 2009/0061288 | A1 | 3/2009 | Gordon et al. |
| 2009/0134040 | A1 | 5/2009 | Gordon et al. |
| 2009/0134842 | A1 | 5/2009 | Joshi et al. |
| 2009/0136830 | A1 | 5/2009 | Gordon |
| 2009/0189567 | A1 | 7/2009 | Joshi et al. |
| 2009/0212743 | A1 | 8/2009 | Hagiwara et al. |
| 2010/0089762 | A1 | 4/2010 | Gordon |
| 2010/0239893 | A1 | 9/2010 | Gordon et al. |
| 2010/0261051 | A1 | 10/2010 | Okada et al. |
| 2010/0285372 | A1 | 11/2010 | Lee et al. |
| 2011/0104526 | A1 | 5/2011 | Boxley et al. |
| 2012/0021273 | A1* | 1/2012 | Ohmori ............... H01M 2/1686 429/144 |
| 2012/0045695 | A1* | 2/2012 | Sheem ................ H01M 4/133 429/231.8 |
| 2012/0126752 | A1 | 5/2012 | Joshi et al. |
| 2012/0141856 | A1 | 6/2012 | Gordon et al. |
| 2012/0164524 | A1* | 6/2012 | Bogdan, Jr. ......... H01M 2/1646 429/199 |
| 2012/0214043 | A1* | 8/2012 | Olschimke ........... H01M 4/381 429/144 |
| 2012/0219833 | A1 | 8/2012 | Coors et al. |
| 2012/0219843 | A1 | 8/2012 | Bogdan et al. |
| 2013/0130085 | A1* | 5/2013 | Choi .................... H01M 4/364 429/105 |

FOREIGN PATENT DOCUMENTS

| | | |
|---|---|---|
| WO | WO 2011057135 | 8/2011 |
| WO | WO 2012061823 | 7/2012 |

OTHER PUBLICATIONS

Young, Lee W., "Written Opinion of the International Searching Authority", PCT Written Opinion for App. No. PCT/US 08/10435, (Nov. 25, 2008),1-4.

Salminen, Justin et al., "Ionic liquids for rechargeable lithium batteries", *Lawrence Berkeley National Laboratory*, (Sep. 21),1-19.

Cullen, Sean P., "Office Action for U.S. Appl. No. 12/205,759", (Sep. 16, 2010),1-22.

Cullen, Sean P., "Office Action for U.S. Appl. No. 12/205,759", (Apr. 13, 2011),1-15.

Lee, Kang Young "International Search Report", International App. No. PCT/US2010/055718, (Jun. 21, 2011),1-3.

Lee, Kang Young "Written Opinion", International App. No. PCT/US2010/055718, (Jun. 21, 2011),1-3.

Suzuki, et al., "Bibliographical Data and Abstract (English Language)", Japanese Patent application JP62-186470, (Aug. 14, 1987),1-2.

Yun, Cho K., "Internationial Search Report", PCT App. No. PCT/US2012/036959 (corresponding to U.S. Appl. No. 13/466,844), (Nov. 23, 2012),1-3.

Yun, Cho K., "Written Opinion of the International Searching Authority", PCT. App. No. PCT/US2012/036959 (corresponding to U.S. Appl. No. 13/466,844), (Nov. 23, 2012),1-5.

Cullen, Sean P., "Non Final Office Action", U.S. Appl. No. 12/205,759, (Apr. 5, 2013),1-17.

Lee, Dong W., "International Serach Report", PCT Application No. PCT/US13/68552 (Corresponding to U.S. Appl. No. 14/072,468), (Jan. 24, 2014),1-3.

Lee, Dong W., "Written Opinion of the International Searching Authority", PCT Application No. PCT/US2013/68552 (Corresponding to U.S. Appl. No. 14/072,468), (Jan. 24, 2014),1-5.

Lee, Dong W., "International Search Report", PCT Application No. PCT/US13/62386 (Corresponding to U.S. Appl. No. 14/040,241), (Dec. 23, 2013),1-3.

Lee, Dong W., "Written Opinion of the International Search Authority", PCT Application No. PCT/US2013/62386 (Corresponding to U.S. Appl. No. 14/040,241), (Dec. 23, 2014),1-5.

Lee, Dong W., "International Search Report", PCT Application No. PCT/US2013/058403 (Corresponding to U.S. Appl. No. 14/019,651), (Dec. 2, 2013),1-3.

Lee, Dong W., "Written Opinion of the International Searching Authority", PCT Application No. PCT/US2013/058403 (Corresponding to U.S. Appl. No. 14/019,651), (Dec. 2, 2013),1-6.

Parsons, Thomas H., "Non Final Office Action", U.S. Appl. No. 13/466,844, (Feb. 26, 2015),1-22.

Marks, Jacob B., "Non Final Office Action", U.S. Appl. No. 14/469,865, (Apr. 7, 2015),1-6.

Shin, Ju C., "International Search Report", PCT Application No. PCT/US2014/059954 (Corresponding with U.S. Appl. No. 14/511,031), (Jan. 20, 2015),1-3.

Shin, Ju C., "Written Opinion of the International Searching Authority", PCT Application No. PCT/US2014/059954 (Corresponding with U.S. Appl. No. 14/511,031), (Jan. 20, 2015),1-4.

(56) References Cited

OTHER PUBLICATIONS

Jarvi, Tommi "Supplementary European Search Report", European Patent Application No. 12783042.0, (Oct. 14, 2014), 1-7.
Takeguchi, Yasuhiro "Final Rejection Action", Japanese Patent Application No. 2012-537241, (Jun. 17, 2014),1-6.
"Notice of Allowance", Japanese Patent Application 2012-537241, (May 11, 2015),1-6.
Parsons, Thomas H., "Final Office Action", U.S. Appl. No. 13/466,844, (Aug. 11, 2015),1-13.
Masatsugu, Morimitsu "English Lanuage Abstract", JP2008293678, (Dec. 4, 2008),1.
Peramunage, et al., "A Solid Sulfur Cathode for Aqueous Batteries", *Science*, vol. 261, (Aug. 20, 1993),1029-1032.
Marks, Jacob B., "Non-Final Office Action", U.S. Appl. No. 12/940,864, (Jun. 18, 2013),1-30.
Marks, Jacob B., "Final Office Action", U.S. Appl. No. 12/940,864, (Jan. 29, 2014),1-11.
Marks, Jacob B., "Notice of Allowance", U.S. Appl. No. 12/940,864, (Jun. 20, 2014),1-7.
Cain, Edward J., "Non Final Office Action", U.S. Appl. No. 14/072,468, (Oct. 5, 2015),1-6.
Quraishi, Kiran "Non-Final Office Action", U.S. Appl. No. 14/040,241, (Oct. 28, 2015),1-12.

* cited by examiner

SODIUM-HALOGEN SECONDARY CELL

CROSS-REFERENCE TO RELATED APPLICATIONS

This application claims the benefit of U.S. Provisional Patent Application Ser. No. 61/697,608 entitled "SODIUM-HALOGEN BATTERY," filed Sep. 6, 2012. This application also claims the benefit of U.S. Provisional Patent Application Ser. No. 61/777,967 entitled "SODIUM-HALOGEN SECONDARY CELL," filed Mar. 12, 2013. This application also claims the benefit of U.S. Provisional Patent Application Ser. No. 61/781,530 entitled "SODIUM-HALOGEN SECONDARY FLOW CELL," filed Mar. 14, 2013. This application also claims the benefit of U.S. Provisional Patent Application Ser. No. 61/736,444 entitled "BATTERY WITH BROMINE OR BROMIDE ELECTRODE AND SODIUM SELECTIVE MEMBRANE," filed Dec. 12, 2012. All of these prior patent applications are expressly incorporated herein by reference.

STATEMENT REGARDING FEDERALLY FUNDED RESEARCH

This invention was made with government support under Contract No. 1189875 awarded by the Sandia National Lab. The government has certain rights in the invention.

TECHNICAL FIELD

The present disclosure relates in general to batteries. More particularly, the present disclosure provides a sodium-based secondary cell (or rechargeable battery) with a sodium ion conductive electrolyte membrane and a liquid positive electrode solution that comprises a halogen and/or a halide.

BACKGROUND

Batteries are known devices that are used to store and release electrical energy for a variety of uses. In order to produce electrical energy, batteries typically convert chemical energy directly into electrical energy. Generally, a single battery includes one or more galvanic cells, wherein each of the cells is made of two half-cells that are electrically isolated except through an external circuit. During discharge, electrochemical reduction occurs at the cell's positive electrode, while electrochemical oxidation occurs at the cell's negative electrode. While the positive electrode and the negative electrode in the cell do not physically touch each other, they are generally chemically connected by at least one (or more) ionically conductive and electrically insulative electrolytes, which can either be in a solid state, a liquid state, or in a combination of such states. When an external circuit, or a load, is connected to a terminal that is connected to the negative electrode and to a terminal that is connected to the positive electrode, the battery drives electrons through the external circuit, while ions migrate through the electrolyte.

Batteries can be classified in a variety of manners. For example, batteries that are completely discharged only once are often referred to as primary batteries or primary cells. In contrast, batteries that can be discharged and recharged more than once are often referred to as secondary batteries or secondary cells. The ability of a cell or battery to be charged and discharged multiple times depends on the Faradaic efficiency of each charge and discharge cycle.

While rechargeable batteries based on sodium can comprise a variety of materials and designs, most, if not all, sodium batteries that require a high Faradaic efficiency employ a solid primary electrolyte separator, such as a solid ceramic primary electrolyte membrane. The principal advantage of using a solid ceramic primary electrolyte membrane is that the Faradaic efficiency of the resulting cell approaches 100%. Indeed, in almost all other cell designs, electrode solutions in the cell are able to intermix over time and, thereby, cause a drop in Faradaic efficiency and loss of battery capacity.

The primary electrolyte separators used in sodium batteries that require a high Faradaic efficiency often consist of ionically conductive polymers, porous materials infiltrated with ionically conductive liquids or gels, or dense ceramics. In this regard, many rechargeable sodium batteries that are presently available for commercial applications comprise a molten sodium metal negative electrode, a sodium β"-alumina ceramic electrolyte separator, and a molten positive electrode, which may include a composite of molten sulfur and carbon (called a sodium/sulfur cell). Because these conventional high temperature sodium-based rechargeable batteries have relatively high specific energy densities and only modest power densities, such rechargeable batteries are typically used in certain specialized applications that require high specific energy densities where high power densities are typically not encountered, such as in stationary storage and uninterruptable power supplies.

Despite the beneficial characteristics associated with some conventional sodium-based rechargeable batteries, such batteries may have significant shortcomings. In one example, because the sodium β"-alumina ceramic electrolyte separator is typically more conductive and is better wetted by molten sodium at a temperature in excess of about 270° C. and/or because the molten positive electrode typically requires relatively high temperatures (e.g., temperatures above about 170° or 180° C.) to remain molten, many conventional sodium-based rechargeable batteries operate at temperatures higher than about 270° C. and are subject to significant thermal management problems and thermal sealing issues. For example, some sodium-based rechargeable batteries may have difficulty dissipating heat from the batteries or maintaining the negative electrode and the positive electrode at the relatively high operating temperatures. In another example, the relatively high operating temperatures of some sodium-based batteries can create significant safety issues. In still another example, the relatively high operating temperatures of some sodium-based batteries require their components to be resistant to, and operable at, such high temperatures. Accordingly, such components can be relatively expensive. In yet another example, because it may require a relatively large amount of energy to heat some conventional sodium-based batteries to the relatively high operating temperatures, such batteries can be expensive to operate and energy inefficient.

Thus, while sodium-based rechargeable batteries are available, challenges with such batteries also exist, including those previously mentioned. Accordingly, it would be an improvement in the art to augment or even replace certain conventional sodium-based rechargeable batteries with other sodium-based rechargeable batteries.

SUMMARY

The present disclosure provides a sodium-halogen secondary cell. While the described sodium-halogen secondary cell can include any suitable component, in some embodiments, it includes a negative electrode compartment housing a negative, sodium-based electrode. In such embodiments, the cell also includes a positive electrode compartment housing a current collector disposed in a liquid positive electrode solution that includes a halogen and/or a halide. The cell also includes a sodium ion conductive electrolyte membrane that separates the negative electrode from the liquid positive electrode solution.

While the negative electrode can comprise any suitable sodium-based anode, in some embodiments, it comprises a sodium metal that is molten as the cell operates. In other implementations, however, the negative electrode comprises a sodium anode or a sodium intercalating carbon that remains solid as the cell functions. In some such implementations in which the negative electrode remains in a solid state as the cell operates, the cell includes a non-aqueous anolyte solution that is disposed between the negative electrode and the electrolyte membrane.

The sodium ion conductive electrolyte membrane can comprise any membrane (which is used herein to refer to any suitable type of separator) that: selectively transports sodium ions; is stable at the cell's operating temperature; is stable when in contact with the positive electrode solution and the negative electrode (or the non-aqueous anolyte); and otherwise allows the cell to function as intended. Indeed, in some non-limiting implementations, the electrolyte membrane comprises a NaSICON-type membrane (e.g., a NaSELECT® membrane, produced by Ceramatec, in Salt Lake City, Utah) that is substantially impermeable to water. Accordingly, in such implementations, the water impermeable electrolyte membrane can allow the positive electrode solution to comprise an aqueous solution, which would react violently if it were to contact the sodium negative electrode.

The current collector in the positive electrode compartment can comprise any suitable material that allows the cell to function as intended. Indeed, in some non-limiting implementations, the current collector comprises a wire, felt, mesh, plate, tube, foam, or other suitable current collector configuration. Additionally, while the current collector can comprise any suitable material, in some implementations, it includes carbon, platinum, copper, nickel, zinc, a sodium intercalation cathode material (e.g., $Na_xMnO_2$), and/or any other suitable current collector material.

The liquid positive electrode solution in the positive electrode compartment can comprise any suitable material that is capable of conducting sodium ions to and from the electrolyte membrane and that otherwise allows the cell to function as intended. Some examples of suitable positive electrode solution materials include, but are not limited to, aqueous (e.g., dimethyl sulfoxide, NMF (N-methylformamide) and the like) and non-aqueous (e.g., glycerol, ionic liquid, organic electrolyte, etc.) solvents that readily conduct sodium ions and that are chemically compatible with the electrolyte membrane. Additionally, in some implementations, the positive electrode solution comprises a molten fluorosulfonyl amide (e.g., 1-Ethyl-3-methylimidazolium-(bis(fluorosulfonyl) amide) ("[EMIM][FSA]").

The positive electrode solution also comprises a halogen and/or halide. Some examples of suitable halogens include bromine, iodine, and chlorine. Similarly, some examples of suitable halides include bromide ions, polybromide ions, iodide ions, polyiodide ions, chloride ions, and polychloride ions. While the halogen/halide can be introduced into the positive electrode solution in any suitable manner, in some embodiments, they are added as NaBr, NaI, or NaCl.

In some implementations, the described cell is modified to limit the amount of free-floating halogen that is present in the positive electrode solution and/or in the positive electrode compartment. While the amount of halogen in the cell can be reduced and/or controlled in any suitable manner, in some implementations, it is done by: including a sufficient amount of a sodium halide (e.g., NaBr, NaI, etc.) and/or an elemental halogen (e.g., bromine, iodine, etc.) to form polyhalides (e.g., $Br_3^-$, $I_3^-$, etc.) from free halogen molecules in the positive electrode solution; by adding a complexing agent (e.g., tetramethyl ammonium bromide, tetramethyl ammonium iodide, N-methyl-N-methylmorpholinium bromide, N-methyl-N-methylmorpholinium iodide, etc.) that is capable of forming an adduct (or otherwise complexing) with halides, halogens, and/or polyhalides in the positive electrode solution; using a current collector comprising a metal (e.g., copper, nickel, zinc, etc.) that oxidizes to form metal ions that can react with halide ions in the solution to form a metal halide (e.g., $CuBr$, $CuI$, $NiBr_2$, $NiI_2$, $ZnBr_2$, $ZnI_2$, etc.) before the halide ions in the solution are oxidized to form the corresponding halogen; and any suitable combination thereof.

In some embodiments where the cell is operated at high temperatures, it may be desirable to have excess sodium halide (e.g., excess $I_2$, $Br_2$) or a complexing agent in order to complex with the formed halogen and keep this component in solution (and not have it convert into a gas). In fact, in some embodiments, up to ⅓ more NaI (sodium halide or complexing agent) may be added to the system. Further, in embodiments that use $I_2$, the casing of the cell may be made of peak stainless steel with Teflon® on the inside, although other less expensive materials, such as other types of stainless steel, may also be used. In yet other embodiments, a cathode chamber may be made of a polyether ether ketone (PEEK) with a Teflon® lining. Teflon® is a registered trademark of the DuPont Company.

In some embodiments, the cell includes a first reservoir that is in fluid communication with the positive electrode compartment. In such embodiments, the reservoir is connected to a pumping mechanism that is configured to force the liquid positive electrode solution to flow from the reservoir and past the current collector in the positive electrode compartment. In some embodiments, the cell also includes a second reservoir that is in fluid communication with the negative electrode compartment. In such embodiments, the reservoir is connected to a pumping mechanism that is configured to force the molten negative electrode (or the non-aqueous anolyte) to flow from the reservoir and through the negative electrode compartment.

The described secondary cell may operate at any suitable operating temperature. Indeed, in some implementations in which the negative electrode is molten as the cell operates, the cell functions (e.g., is discharged or recharged) while the temperature of the negative electrode is between about 100° C. and about 150° C. (e.g., about 120° C.±about 10° C.). Additionally, in some implementations in which the negative electrode remains in a solid state as the cell functions, the temperature of the negative electrode remains below about 60° C. (e.g., about 20° C.±about 10° C.). Further embodiments may be designed in which the cell operates at less than 250° C., or at less than 200° C., or at less than 180° C., or at less than 150° C., etc.

These features and advantages of the present embodiments will become more fully apparent from the following description and appended claims.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," "in another embodiment," and similar language throughout this specification may, but do not necessarily, all refer to the same embodiment. Additionally, while the following description refers to several embodiments and examples of the various components and aspects of the described invention, all of the described embodiments and examples are to be considered, in all respects, as illustrative only and not as being limiting in any manner.

Furthermore, the described features, structures, or characteristics of the invention may be combined in any suitable manner in one or more embodiments. In the following description, numerous specific details are provided, such as examples of suitable sodium-based negative electrodes, liquid positive electrode solutions, current collectors, sodium ion conductive electrolyte membranes, etc., to provide a thorough understanding of embodiments of the invention. One having ordinary skill in the relevant art will recognize, however, that the invention may be practiced without one or more of the specific details, or with other methods, components, materials, and so forth. In other embodiments, well-known structures, materials, or operations are not shown or described in detail to avoid obscuring aspects of the invention.

As stated above, secondary cells can be discharged and recharged and this specification describes cell arrangements and methods for both states. Although the term "recharging" in its various forms implies a second charging, one of skill in the art will understand that discussions regarding recharging would be valid for, and applicable to, the first or initial charge, and vice versa. Thus, for the purposes of this specification, the terms "recharge," "recharged," and "rechargeable" shall be interchangeable with the terms "charge," "charged," and "chargeable," respectively.

Figure 1:
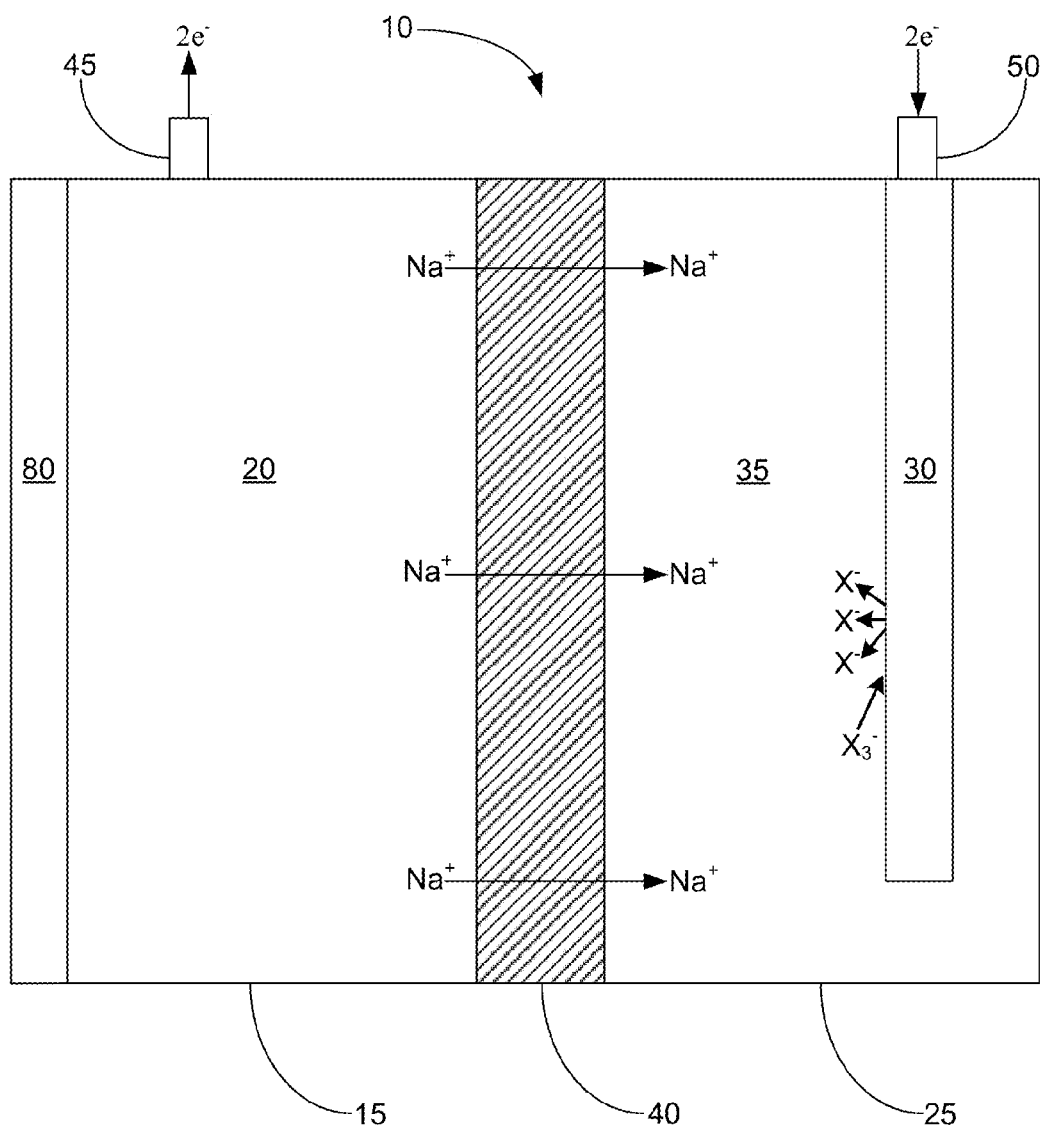
FIG. 1 depicts a schematic diagram of a representative embodiment of a sodium-halogen secondary cell comprising a molten sodium negative electrode, wherein the cell is in the process of being discharged.

The present embodiments provide a sodium-halogen secondary cell, which includes a negative electrode comprising sodium and a liquid positive electrode solution that comprises at least one of a halogen and a halide. Although the described cell can comprise any suitable component, FIG. 1 shows a representative embodiment in which the sodium-halogen secondary cell 10 comprises a negative electrode compartment 15 that includes a sodium-based negative electrode 20, a positive electrode compartment 25 that comprises a current collector 30 that is disposed in a liquid positive electrode solution 35, a sodium ion conductive electrolyte membrane 40 that separates the negative electrode from the positive electrode solution, a first terminal 45, and a second terminal 50. To provide a better understanding of the described cell 10, a brief description of how the cell functions is provided below. Following this discussion, each of the cell's components shown in FIG. 1 is discussed in more detail.

Turning now to the manner in which the sodium-halogen secondary cell 10 functions, the cell can function in virtually any suitable manner. In one example, FIG. 1 illustrates that as the cell 10 is discharged and electrons (e⁻) flow from the negative electrode 20 (e.g., via the first terminal 45), sodium is oxidized from the negative electrode 20 to form sodium ions (Na⁺). FIG. 1 shows these sodium ions are respectively transported from the sodium-based negative electrode 20, through the sodium ion conductive electrolyte membrane 40, and to the positive electrode solution 35.

Figure 2:
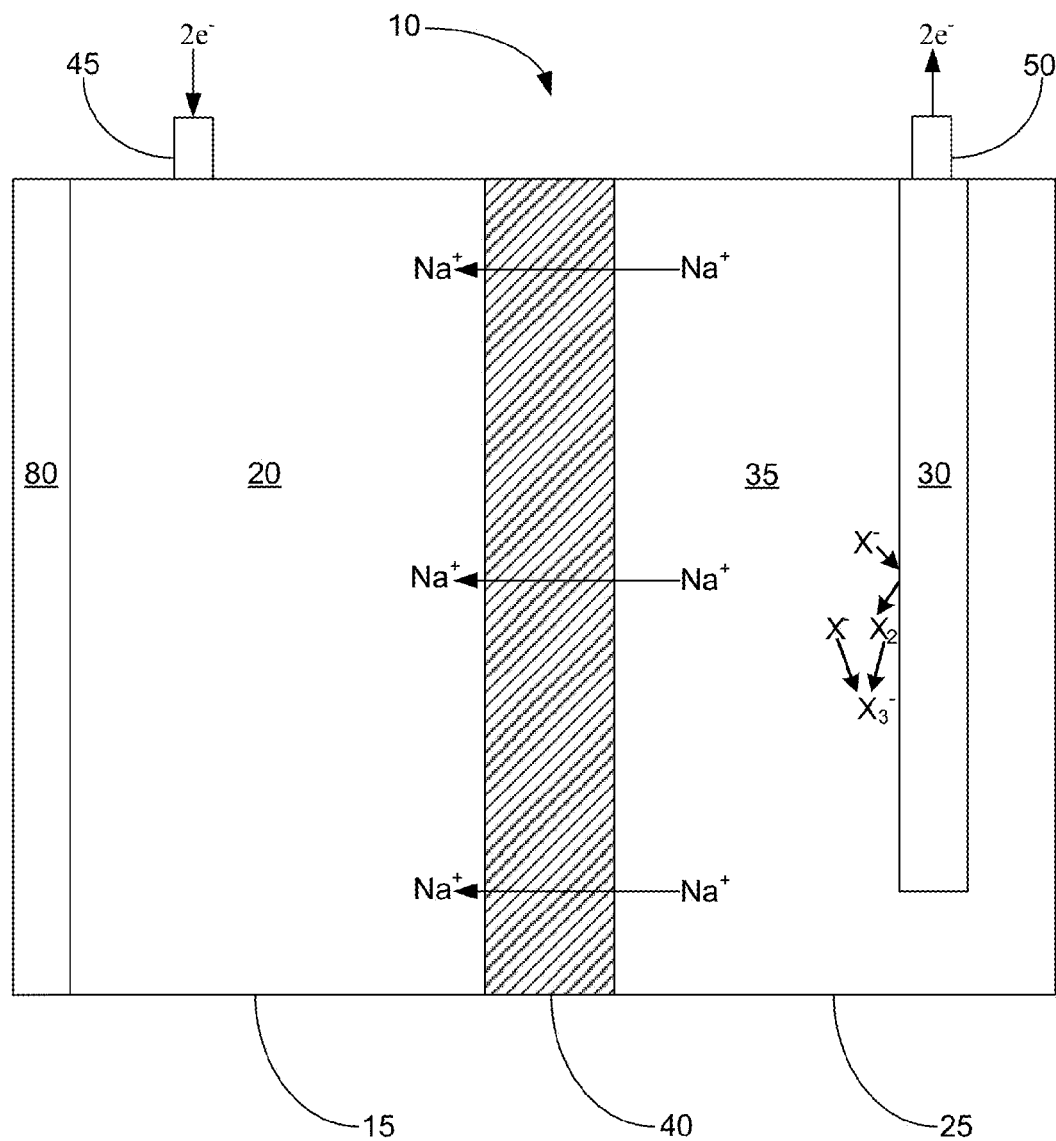
FIG. 2 depicts a schematic diagram of a representative embodiment of the sodium-halogen secondary cell comprising the molten sodium negative electrode, wherein the cell is in the process of being recharged.

In a contrasting example, FIG. 2 shows that as the secondary cell 10 is recharged and electrons (e⁻) flow into the sodium-based negative electrode 20 from an external power source (not shown), such as a recharger, the chemical reactions that occurred when the cell 10 was discharged (as shown in FIG. 1) are reversed. Specifically, FIG. 2 shows that as the cell 10 is recharged, sodium ions ($Na^+$) are respectively transported from the positive electrode solution 35, through the electrolyte membrane 40, and to the negative electrode 20, where the sodium ions are reduced to form sodium metal (Na).

Figure 3:
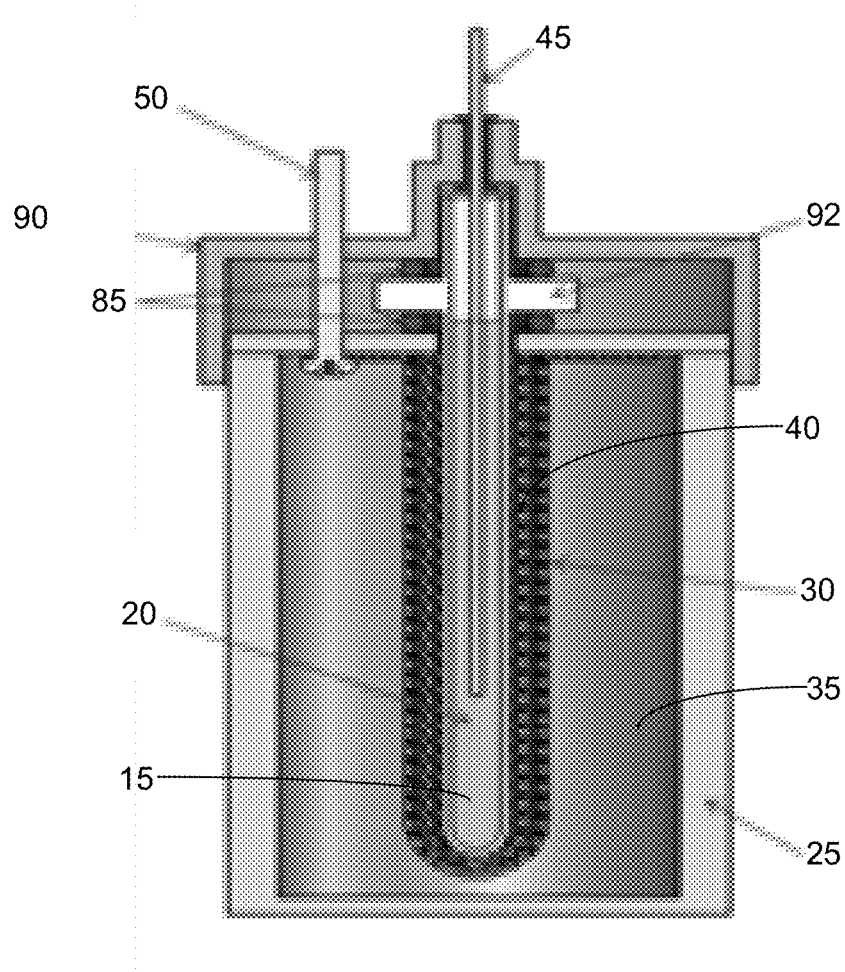
FIG. 3 depicts a cross-sectional perspective view of a representative embodiment of the sodium-halogen secondary cell, wherein the cell comprises a tubular design in which a negative electrode compartment is at least partially disposed within a positive electrode compartment of the cell.

Referring now to the various components of the cell 10, the cell (as mentioned above) can comprise a negative electrode compartment 15 and a positive electrode compartment 25. In this regard, the two compartments can be any suitable shape or size and have any other suitable characteristic that allows the cell 10 to function as intended. By way of example, the negative electrode compartment and the positive electrode compartments can be tubular, rectangular, or be any other suitable shape. Furthermore, the two compartments can have any suitable spatial relationship with respect to each other. For instance, while FIG. 2 shows some embodiments in which the negative electrode compartment 15 and the positive electrode compartment 25 are adjacent to each other, FIG. 3 shows some embodiments in which one compartment (e.g., the negative electrode compartment 15) is disposed, at least partially, within the other compartment (e.g., the positive electrode compartment 25), while the contents of the two compartments remain separated by the electrolyte membrane 40 and any other compartmental walls.

With respect to the negative electrode 20, the cell 10 can comprise any suitable sodium-based negative electrode 20 that allows the cell 10 to function (e.g., be discharged and recharged) as intended. Some examples of suitable sodium-based negative electrode materials include, but are not limited to, a sodium sample that is substantially pure, a sodium alloy comprising any other suitable sodium-containing negative electrode material, and a sodium intercalation material. Indeed, in certain embodiments, the negative electrode comprises or consists of an amount of sodium that is substantially pure. In other embodiments, however, the negative electrode comprises or consists of a sodium intercalation material.

Where the negative electrode 20 comprises a sodium intercalation material, the intercalation material can comprise any suitable material that allows sodium metal in the negative electrode to be oxidized to form sodium ions ($Na^+$) as the cell 10 is discharged, and that also allows sodium ions to be reduced and to intercalate with the intercalation material as the cell is recharged. In some embodiments, the intercalation material also comprises a material that causes little to no increase in the resistance of the electrolyte membrane 40 (discussed below). In other words, in some embodiments, the intercalation material readily transports sodium ions there through and has little to no adverse effect on the rate at which sodium ions pass from the negative electrode compartment 15 to the positive electrode compartment 25 (and vice versa).

In some embodiments, the intercalation material in the negative electrode 20 comprises sodium metal (and/or a sodium metal alloy) intercalated with carbon (e.g., graphite, mesoporous carbon, boron-doped diamond, carbon, and/or graphene). Thus, some embodiments of the negative electrode comprise a sodium intercalating carbon material.

As the cell 10 operates (e.g., discharges and/or charges), the sodium-based negative electrode 20 may be at any suitable temperature that allows the cell to function as intended. Indeed, in some embodiments (e.g., embodiments in which the negative electrode comprises sodium metal), the cell functions at any suitable operating temperature that allows the negative electrode to be molten as the cell functions. Indeed, in some embodiments in which the cell comprises a molten negative electrode, the temperature of the negative electrode as the cell functions (or the operating temperature) is between about 100° C. and about 155° C. In other embodiments, the operating temperature of the cell is between about 110° C. and about 150° C. In still other embodiments, the operating temperature of the cell is between about 115° C. and about 125° C. In yet other embodiments in which the negative electrode is molten as the cell operates, the cell has an operating temperature that falls within any sub-range of the aforementioned operating temperature ranges (e.g., about 120° C.±2° C.). In further embodiments, the cell may operate at higher temperatures, such as less than 250° C., less than 200° C., less than 180° C., etc.

In embodiments in which the negative electrode 20 remains solid as the cell 10 operates (e.g., embodiments in which the negative electrode comprises a sodium intercalating carbon and/or a solid sodium anode), the cell functions at any suitable operating temperature that allows the cell to function as intended. Indeed, in some embodiments in which the negative electrode is solid as the cell functions, the operating temperature of the cell is between about −20° C. and about 98° C. In other such embodiments, the operating temperature of the cell is between about 18° C. and about 65° C. In still other such embodiments, the operating temperature of the cell is between about 20° C. and about 60° C. In still other embodiments, the operating temperature of the cell is between about 30° C. and about 50° C. In yet other embodiments in which the negative electrode remains in a solid state as the cell operates, the cell has an operating temperature that falls within any sub-range of the aforementioned operating temperature ranges (e.g., about 20° C.±10° C.).

Figure 4:
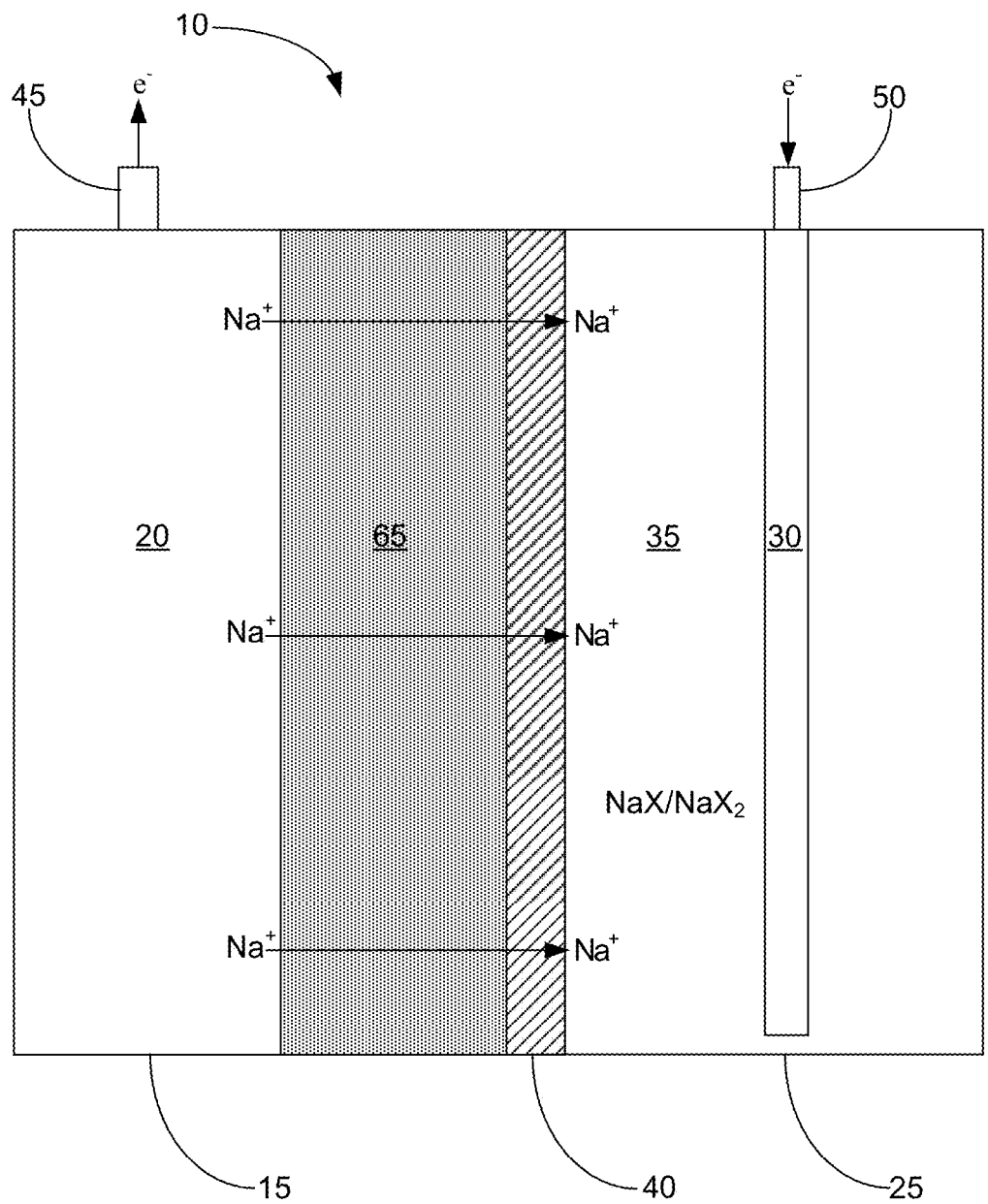
FIG. 4 depicts a schematic diagram of a representative embodiment of the sodium-halogen secondary cell, wherein the cell comprises a solid negative electrode and a non-aqueous anolyte solution disposed between the negative electrode and a solid sodium conductive electrolyte membrane.

Although, in some embodiments (e.g., where the negative electrode 20 is molten as the cell 10 operates), the negative electrode 20 is in direct contact with (and/or wets) the electrolyte membrane 40, in other embodiments (e.g., where the negative electrode remains solid as the cell functions), the negative electrode is optionally not in direct contact with the electrolyte membrane. Indeed, FIG. 4 shows that, in some embodiments in which the negative electrode 20 remains solid as the cell 10 operates, a non-aqueous anolyte solution 65 separates the negative electrode 20 from the electrolyte membrane 40. In such embodiments, the non-aqueous anolyte solution can perform any suitable function, including, without limitation, providing a physical buffer between the negative electrode and the electrolyte membrane to prevent (or at least impede) the negative electrode from cracking or otherwise damaging the electrolyte membrane.

Where the cell 10 comprises a non-aqueous anolyte solution 65, the anolyte solution can comprise any suitable chemical that is chemically compatible with the negative electrode 20 and the electrolyte membrane 40, and that is sufficiently conductive to allow sodium ions to pass from the negative electrode to the electrolyte membrane and vice versa. In this regard, some examples of suitable non-aqueous anolytes include, but are not limited to, propylene carbonate; ethylene carbonate; one or more organic electrolytes, ionic liquids, polar aprotic organic solvents, polysiloxane compounds, acetonitrile base compounds, etc.; ethylacetate; and/or any other suitable non-aqueous liquid and/or gel. For a more-detailed description of suitable non-aqueous anolyte solutions, see U.S. Patent Application Publication No. 2011/0104526, filed Nov. 5, 2010; the entire disclosure of which is incorporated herein by reference.

With regards now to the sodium ion conductive electrolyte membrane 40, the membrane can comprise any suitable material that selectively transports sodium ions and permits the cell 10 to function with a non-aqueous positive electrode solution 35 or an aqueous positive electrode solution 35. In some embodiments, the electrolyte membrane comprises a NaSICON-type (sodium Super Ion CONductive) material. Where the electrolyte membrane comprises a NaSICON-type material, the NaSICON-type material may comprise any known or novel NaSICON-type material that is suitable for use with the described cell 10. Some suitable examples of NaSICON-type compositions include, but are not limited to, $Na_3Zr_2Si_2PO_{12}$, $Na_{1+x}Si_xZr_2P_{3-x}O_{12}$ (where x is between about 1.6 and about 2.4), Y-doped NaSICON ($Na_{1+x+y}Zr_{2-y}Y_ySi_xP_{3-x}O_{12}$, $Na_{1+x}Zr_{2-y}Y_ySi_xP_{3-x}O_{12-y}$ (where x=2, y=0.12)), $Na_{1-x}Zr_2Si_xP_{3-x}O_{12}$ (where x is between about 0 and about 3, and in some cases between about 2 and about 2.5), and Fe-doped NaSICON ($Na_3Zr_2/_3Fe_4/_3P_3O_{12}$). Indeed, in certain embodiments, the NaSICON-type membrane comprises $Na_3Si_2Zr_2PO_{12}$. In other embodiments, the NaSICON-type membrane comprises one or more NaSELECT® materials, produced by Ceramatec, Inc. in Salt Lake City, Utah. In still other embodiments, the NaSICON-type membrane comprises a known or novel composite, cermet-supported NaSICON membrane. In such embodiments, the composite NaSICON membrane can comprise any suitable component, including, without limitation, a porous NaSICON-cermet layer that comprises NiO/NaSICON or any other suitable cermet layer, and a dense NaSICON layer. In yet other embodiments, the NaSICON membrane comprises a monoclinic ceramic.

Figure 5A:
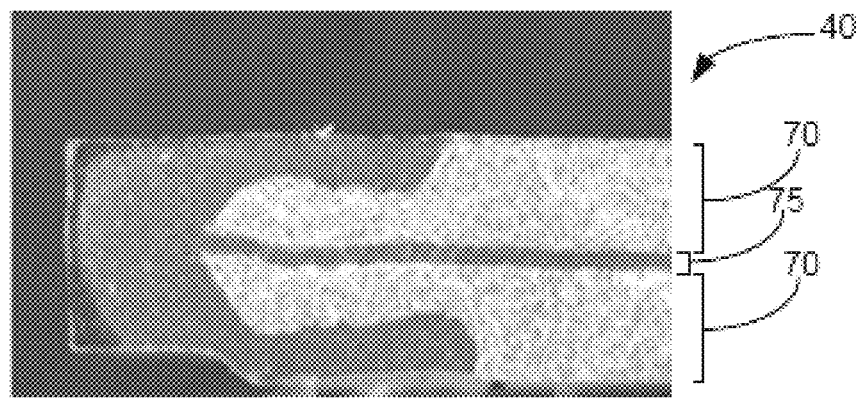
FIGS. 5A and 5B each contain a cross-sectional micrograph of a representative embodiment of a NaSICON-type material suitable for use with some embodiments of the invention.
Figure 5B:
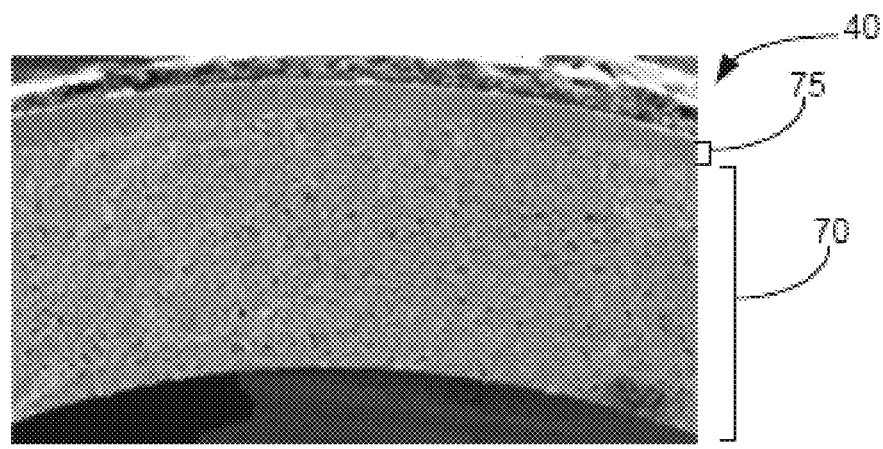

In some embodiments (as shown in FIGS. 5A and 5B), the electrolyte membrane 40 comprises a first porous substrate 70 (e.g., a relatively thick, porous NaSICON-type material) supporting a relatively thin, dense layer 75 of a NaSICON-type material. In such embodiments, the first porous substrate can perform any suitable function, including acting as a scaffold for the dense layer. As a result, some implementations of the electrolyte membrane can minimize ohmic polarization loss at the relatively low operating temperatures discussed above. Additionally, in some embodiments, by having both a porous scaffold and a dense NaSICON-type layer, the electrolyte membrane can have a relatively high mechanical strength (e.g., such that it allows the pressure in the cell 10 to change as the cell is pressurized, operated, etc.).

While the porous substrate layer 70 can be any suitable thickness, in some embodiments, it is between about 50 μm and about 1250 μm thick. In other embodiments, the porous substrate layer is between about 500 μm and about 1,000 μm thick. In still other embodiments, the porous substrate layer is between about 700 μm and about 980 μm. In still other embodiments, the porous substrate layer has a thickness that falls in any suitable sub-range of the aforementioned ranges (e.g., between about 740 μm and about 960 μm).

The dense layer 75 on the substrate layer 70 can be any suitable thickness that allows the cell 10 to function as intended. Indeed, in some embodiments the dense layer (e.g., a dense layer of a NaSICON-type material) has a thickness between about 20 μm and about 400 μm. In other embodiments, the dense layer has a thickness between about 45 μm and about 260 μm. In still other embodiments, the dense layer has a thickness that falls in any sub-range of the aforementioned thicknesses (e.g., about 50 μm±10 μm).

The electrolyte membrane 40 can have any suitable sodium conductivity that allows the cell 10 to operate as intended. Indeed, in some embodiments (e.g., where the electrolyte membrane comprises NaSELECT® or another suitable NaSICON-type material), the electrolyte membrane has a conductivity of between about $4\times10^{-3}$ S/cm$^{-1}$ and about $20\times10^{-3.5}$ cm$^{-1}$ (or any sub-range thereof).

Where the electrolyte membrane 40 comprises a NaSICON-type material, the NaSICON-type material may provide the cell 10 with several beneficial characteristics. In one example, because NaSICON-type materials, as opposed to a sodium β"-alumina ceramic electrolyte separator, are substantially impermeable to, and stable in the presence of, water, NaSICON-type materials can allow the cell to include a positive electrode solution 35, such as an aqueous positive electrode solution, that would otherwise be incompatible with the sodium negative electrode 20. Thus, the use of a NaSICON-type membrane as the electrolyte membrane can allow the cell to have a wide range of battery chemistries. As another example of a beneficial characteristic that can be associated with NaSICON-type membranes, because such membranes selectively transport sodium ions but do not allow the negative electrode 20 and the positive electrode solutions 35 to mix, such membranes can help the cell to have minimal capacity fade and to have a relatively stable shelf life at ambient temperatures. Indeed, some NaSICON-type materials (e.g., NaSELECT® membranes) eliminate self-discharge, crossover, and/or related system inefficiencies due to the materials' solid-solid perm-selectivity.

With respect to the current collector 30, the cell 10 can comprise any suitable current collector that allows the cell to be charged and discharged as intended. For instance, the current collector can comprise virtually any current collector configuration that has been successfully used in a sodium-based rechargeable battery system. In some embodiments, the current collector comprises one or more wires, felts, plates, parallel plates, tubes, meshes, mesh screens, foams (e.g., metal foams, carbon foams, etc.), and/or other suitable current collector configuration. Indeed, in some embodiments, the current collector comprises a configuration having a relatively large surface area (e.g., one or more mesh screens, metal foams, etc.).

The current collector 20 can comprise any suitable material that allows the cell 10 to function as intended. In this regard, some non-limiting examples of suitable current collector materials include carbon, platinum, copper, nickel, zinc, a sodium intercalation material (e.g., $Na_xMnO_2$, etc.), nickel foam, nickel, a sulfur composite, a sulfur halide (e.g., sulfuric chloride), and/or another suitable material. Furthermore, these materials may coexist or exist in combinations. In some embodiments, however, the current collector comprises carbon, platinum, copper, nickel, zinc, and/or a sodium intercalation material (e.g., $Na_xMnO_2$).

The current collector 30 can be disposed in any suitable location in the positive electrode compartment 25 that allows the cell 10 to function as intended. In some embodiments, however, the current collector is disposed on (e.g., as shown in FIG. 3) or in close proximity to the electrolyte membrane 40 (e.g., as shown in FIG. 6).

With respect now to the positive electrode solution 35, that solution can comprise any suitable sodium ion conductive material that allows the cell 10 to function as intended. Indeed, in some embodiments, the positive electrode solution comprises an aqueous or a non-aqueous solution. In this regard, some examples of suitable aqueous solutions comprise, but are not limited to, dimethyl sulfoxide ("DMSO"), water, formamide, NMF, an aqueous sodium hydroxide (NaOH) solution, an ionic aqueous solution, and/or any other aqueous solution that is chemically compatible with sodium ions and the electrolyte membrane 40. Indeed, in some embodiments, positive electrolyte solution comprises DMSO and/or formamide.

In some embodiments, the positive electrode solution 35 comprises a non-aqueous solvent. In such embodiments, the positive electrode solution can comprise any suitable non-aqueous solvent that allows the cell 10 to function as intended. Some examples of such non-aqueous solvents include, without limitation, glycerol, ethylene, propylene, and/or any other non-aqueous solution that is chemically compatible with sodium ions and the electrolyte membrane 40.

Figure 6:
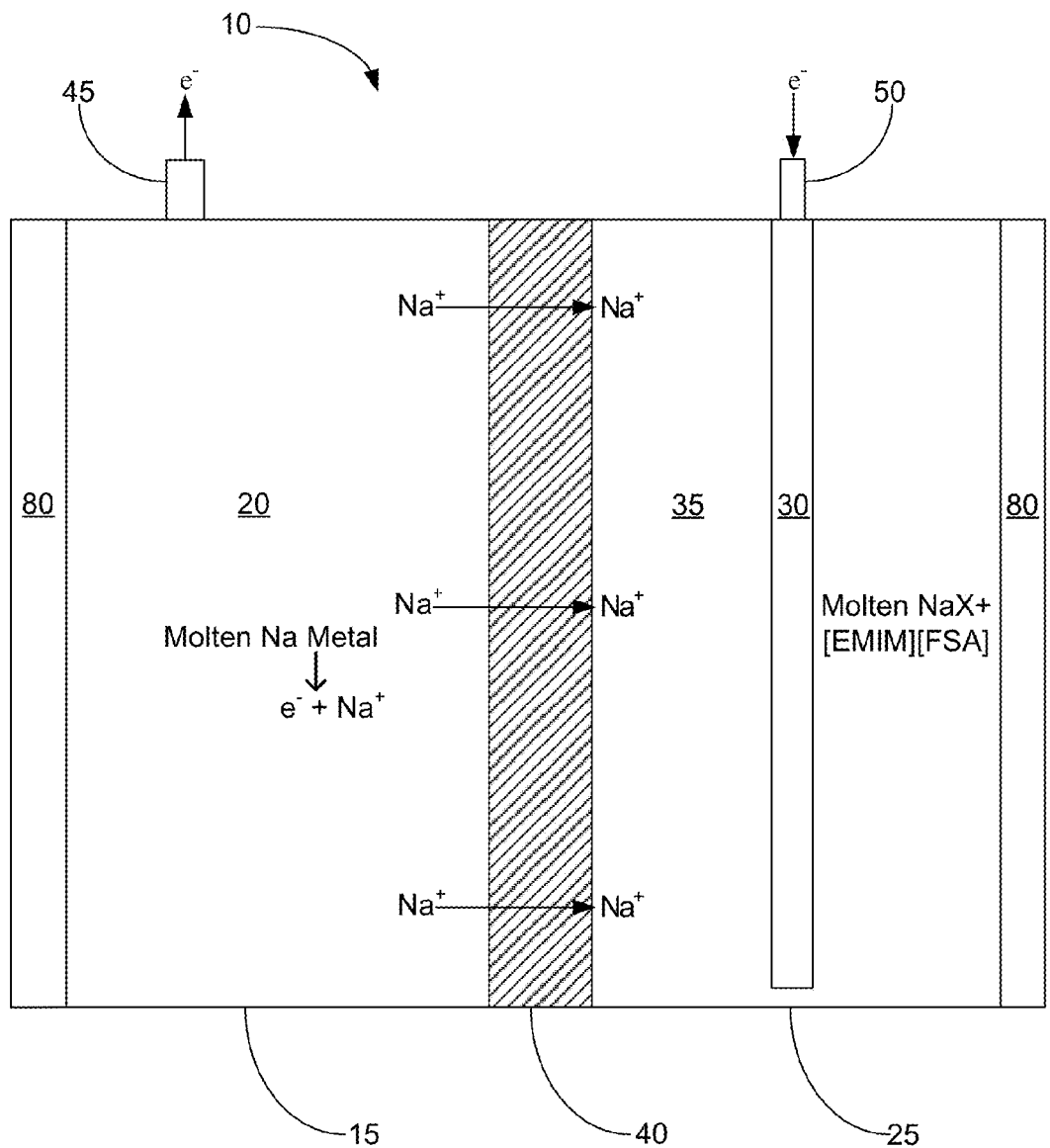
FIG. 6 depicts a schematic diagram of a representative embodiment of the sodium-halogen secondary cell, wherein a positive electrode solution in the cell comprises a molten sodium halide and a molten sodium fluourosulfonyl amide.

In some embodiments (e.g., embodiments that comprise a molten sodium negative electrode 20 and a sodium intercalation current collector 30 (e.g., $Na_xMnO_2$), as shown in FIG. 6), the positive electrode solution 35 comprises a molten sodium-FSA (sodium-bis(fluorosulfonyl)amide) electrolyte. Indeed, as Na-FSA has a melting point of about 107° C. (which allows Na-FSA to be molten at some typical operating temperatures of the cell 10), and as Na-FSA has a conductivity in the range of about 50-100 $mS/cm^2$, in some embodiments, Na-FSA serves as a useful solvent (e.g., for a molten sodium halide (NaX, wherein X is selected from Br, I, Cl, etc.)). In this regard, Na-FSA has the following structure:

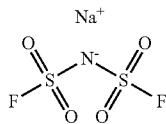

Where the positive electrode solution 35 comprises Na-FSA, the solution can comprise any suitable fluorosulfonyl amide that is capable of conducting sodium ions to and from the electrolyte membrane and that otherwise allows the cell 10 to function as intended. Some examples of suitable fluorosulfonyl amides include, without limitation, 1-Ethyl-3-methylimidazolium-(bis(fluorosulfonyl) amide ("[EMIM][FSA]"), and other similar chemicals.

In some embodiments, the positive electrode solution 35 also comprises one or more halogens and/or halides. In this regard, the halogens and halides, as well polyhalides and/or metal halides that form therefrom (e.g., where the current collector 30 comprises a metal, such as copper, nickel, zinc, etc. (as discussed below)) can perform any suitable function, including, without limitation, acting as the positive electrode as the cell 10 operates. Some examples of suitable halogens include bromine, iodine, and chlorine. Similarly, some examples of suitable halides include bromide ions, polybromide ions, iodide ions, polyiodide ions, chloride ions, and polychloride ions. While the halogens/halides can be introduced into the positive electrode solution in any suitable manner, in some embodiments, they are added as NaX, wherein X is selected from Br, I, Cl, etc.

In some embodiments in which the positive electrode solution 35 comprises a halogen ("X") (e.g., bromine or iodine) and/or halide, the cell may have the following reactions as at the negative electrode 20, the positive electrode/current collector 30, and the overall reaction of the cell as it operates:

Negative electrode $Na \leftrightarrow Na^+ + 1e^-$

Positive electrode $2X^- + 2e^- \leftrightarrow X_2$

Overall $2Na + X_2 \leftrightarrow 2Na^+ + 2X^-$

Accordingly, where X comprises iodine, the cell 10 may have the following chemical reactions and the following theoretical voltage (V) and theoretical specific energy (Wh/kg):

Negative electrode $Na \leftrightarrow Na^+ + 1e^- (-2.71V)$

Positive electrode $2I^- + 2e^- \leftrightarrow I_2 (0.52V)$

Overall $2Na + I_2 \leftrightarrow 2Na^+ + 2I^- (3.23V)(581\ Wh/kg)$

Additionally, where X comprises bromine, the cell may have the following chemical reactions and the following theoretical voltage and theoretical specific energy:

Negative electrode $Na \leftrightarrow Na^+Na^+ + 1e^- (-2.71V)$

Positive electrode $2Br^- + 2e^- \leftrightarrow Br_2 (1.08V)$

Overall $2Na + Br_2 \leftrightarrow 2Na^+ + 2Br^- (3.79V)(987\ Wh/kg)$

The various ingredients in the positive electrode solution 35 can be present in the cell at any suitable concentrations that allow the cell 10 to function as intended.

In some embodiments, halogens (e.g., bromine, iodine, or chlorine) are formed in the cell 10 as it operates (e.g., charges). In this regard, the halogens can have several effects on the cell as it functions. In one example, halogens produced in the positive electrode solution 35 can have relatively high vapor pressures that, in turn, can expose the cell to undesirable pressures. In another example, halogens in the positive electrode solution can react with other reagents in the solution to form undesirable chemicals (e.g., HOX and/or HX, where the positive electrode solution is aqueous and wherein X is selected from Br, I, etc.). In some implementations, in order to reduce and/or prevent the challenges that can be associated with halogens produced in the positive electrode solution, the cell is modified to reduce the total amount of elemental halogen (e.g., bromine, iodine, etc.) that is present in the positive electrode solution. In such implementations, the cell can be modified in any suitable manner that allows the cell to operate while controlling the amount of halogens that are present in the positive electrode solution.

In some embodiments, to reduce the amount of halogens in the positive electrode solution 35, the solution comprises an excess amount of a sodium halide (e.g., sodium bromide, sodium iodide, sodium chloride, etc.) and/or an excess amount of an elemental halogen (e.g., bromine, iodine, chlorine, etc.). In such embodiments, the positive electrode solution can comprise any suitable amount of the sodium halide and/or the elemental halogen that allows one or more polyhalides (e.g., $Br_3^-$, $I_3^-$, $Cl_3^-$, etc.) to form in the positive electrode solution 35 (as shown in FIG. 2, wherein X represents Br, I, or Cl). In such embodiments, the polyhalides can have a lower vapor pressure than their corresponding halogens, while still having an electroactively similar to their corresponding halogens.

In some embodiments, to reduce the amount of halogens in the positive electrode solution 35, the positive electrode solution comprises one or more complexing agents that are capable of complexing with or otherwise forming an adduct (e.g., a halide-amine adduct, a halide-ammonium adduct, etc.) with halogens, halides, and/or polyhalides in the positive electrode solution. In this regard, the complexing agent can comprise any chemical that is capable of forming an adduct and/or complex with halogens, halides, and/or polyhalides in the positive electrode solution. Some non-limiting examples of such complexing agents include one or more bromide-amine adducts, iodide-amine adducts, chloride-amine adducts tetramethyl ammonium halides (e.g., tetramethyl ammonium bromide, tetramethyl ammonium iodide, tetramethyl ammonium chloride, etc.), ammonium compounds, N-methyl-N-methylmorpholinium halide, etc. Indeed, in some embodiments in which the positive electrode solution comprises $NaBr/Br_2$, the complexing agent comprises tetramethyl ammonium bromide, which reacts with bromine to form tetramethyl ammonium tri-bromide. In some other embodiments (e.g., embodiments in which the negative electrode compartment 15 comprises a non-aqueous anolyte 65, the positive electrode solution 35 comprise NaBr/Br$_2$, and the current collector 30 comprises carbon, as shown in FIG. 4), the complexing agent comprises N-methyl-N-methylmorpholinium bromide.

In still other embodiments, in order to reduce the amount of halogen produced in the positive electrode solution 35, the cell 10 circumvents the generation of halogens (e.g., bromine, iodine, chlorine, etc.) by utilizing a metal current collector 30 that forms a metal halide that corresponds to the metal used in the current collector and the halide ions in the solution. While such a process can be performed in any suitable manner, in some embodiments, it relies on the metal in the current collector being oxidized before the halide ions in the positive electrode solution are oxidized to form a corresponding halogen. Thus, the result is the formation of a non-volatile metal halide (e.g., CuBr, NiBr$_2$, ZnBr$_2$, CuI, NiI$_2$, ZnI$_2$, etc.). In this regard, the current collector can comprise any suitable metal that is capable of circumventing the generation of a halogen by forming a metal halide as the cell operates. Some examples of such metals include copper, nickel, zinc, combinations thereof, and alloys thereof. In this regard, some examples of corresponding half-cell reactions for cells comprising such metal current collectors include the following:

$$Cu+X^- \leftrightarrow CuX+1e^-$$

$$Ni+2X^- \leftrightarrow NiX_2+2e^-$$

$$Zn+2X^- \leftrightarrow ZnX_2+2e^-$$

Additionally, one example of a full-cell reaction for a NaBr/Br$_2$ cell 10 comprising a nickel current collector 30 is as follows:

$$2Na+NiBr_2 \leftrightarrow 2NaBr+Ni$$

While cells comprising metal current collectors 30 can generate a wide variety of voltage ranges, in some cases in which the cell 10 comprises NaBr/Br$_2$ in the positive electrode solution 35 and the current collector comprises copper, nickel, or zinc, the voltage produced by such a cell is about 2.57V, about 2.61V, and about 2V, respectively.

In still some other embodiments, to reduce the total amount of halogen (e.g., bromine, iodine, etc.) in the positive electrode compartment 25, the cell 10 is modified to include any suitable combination of the aforementioned techniques. By way of non-limiting example, some embodiments of the cell include a current collector 30 comprising copper, nickel, zinc, or another suitable metal, and the positive electrode solution 35 comprises a complexing agent, an excess amount of a sodium halide, and/or an excess amount of an elemental halogen.

With reference now to the terminals 45 and 50, the cell 10 can comprise any suitable terminals that are capable of electrically connecting the cell with an external circuit (not shown), including without limitation, to one or more cells. In this regard, the terminals can comprise any suitable material, be of any suitable shape, and be of any suitable size.

Figure 1A:
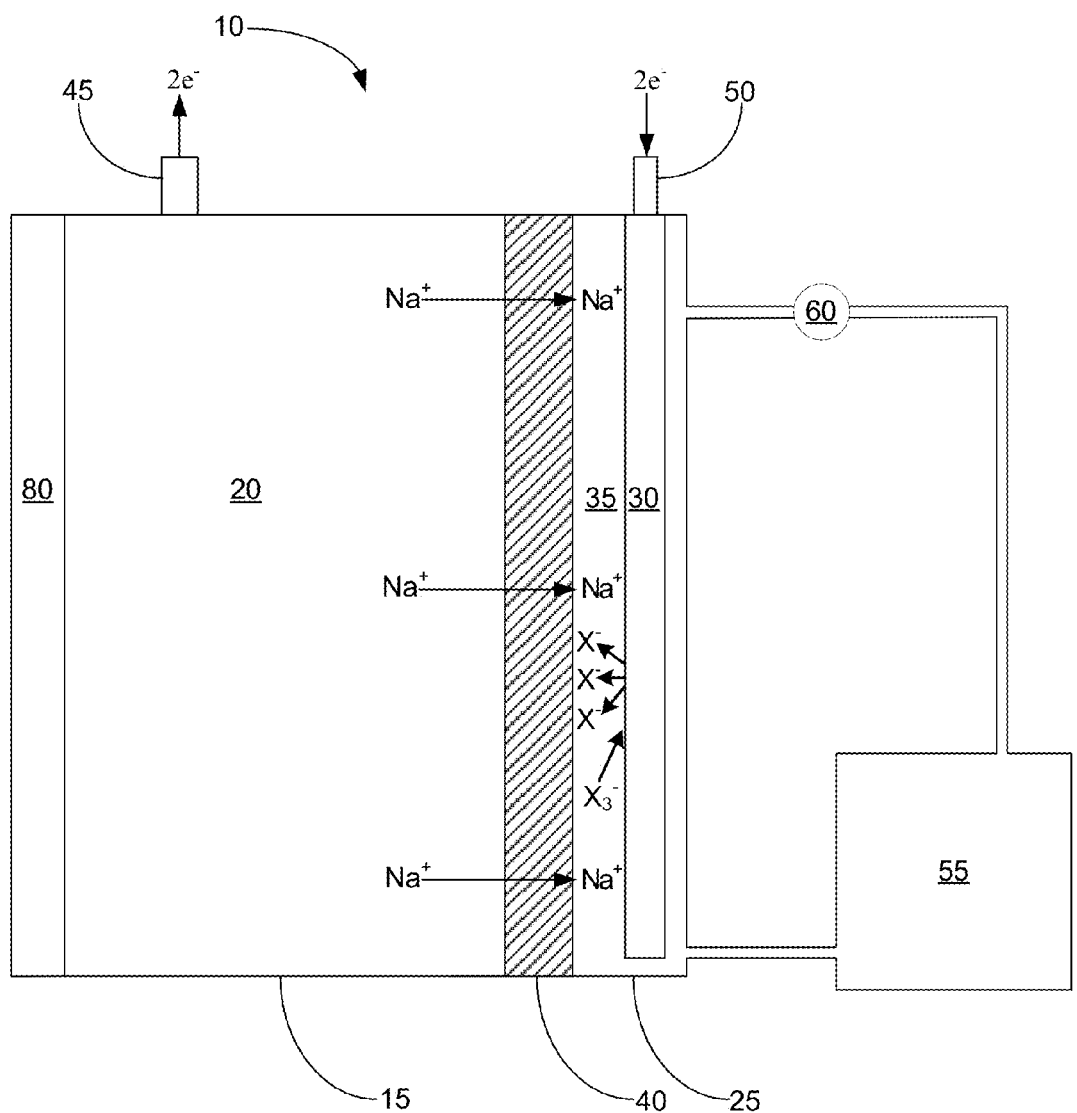
FIG. 1A depicts a schematic diagram of a representative embodiment of a sodium-halogen secondary cell comprising a molten sodium negative electrode and a pumping mechanism, wherein the cell is in the process of being discharged.
Figure 2A:
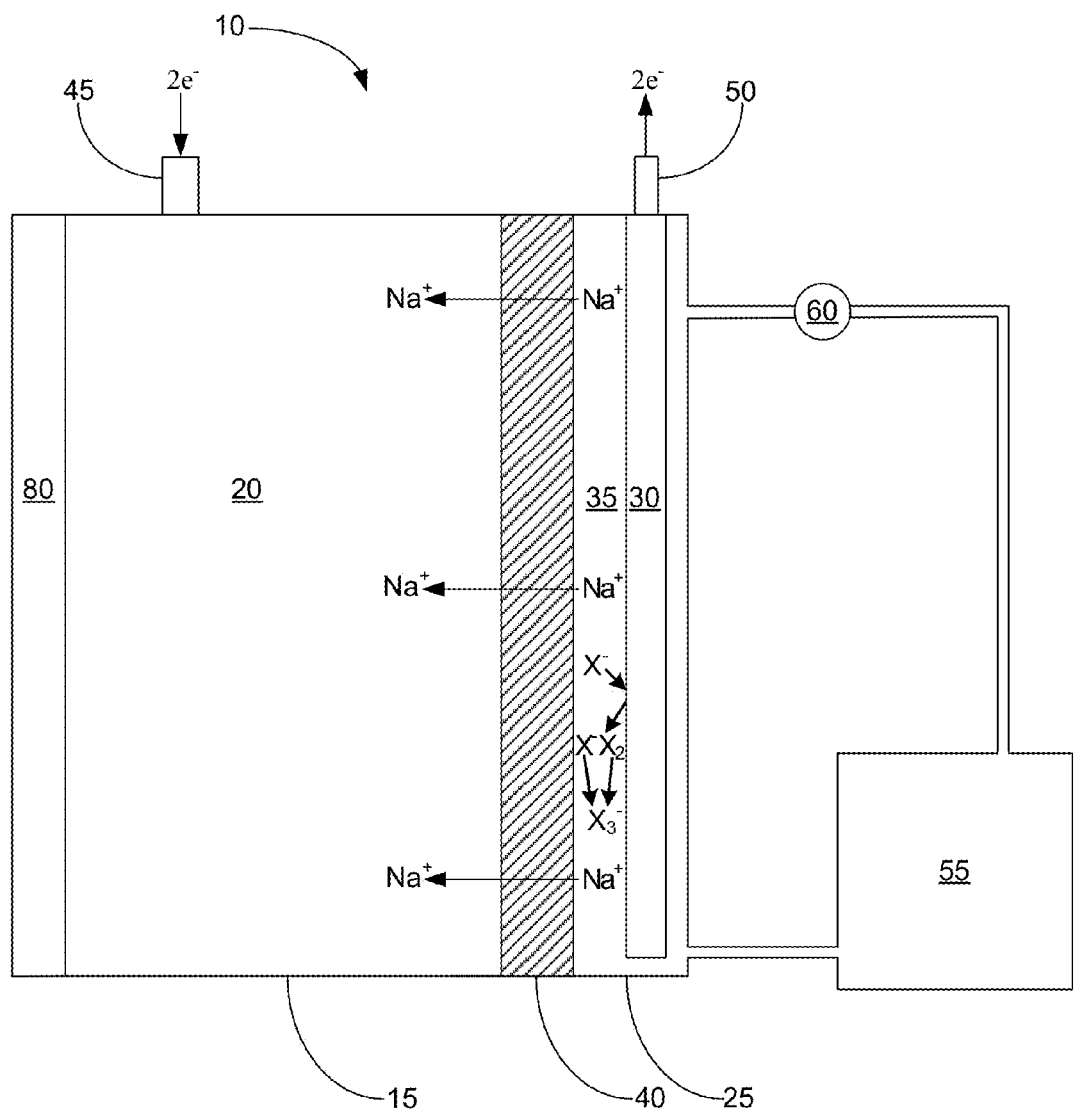
FIG. 2A depicts a schematic diagram of a representative embodiment of the sodium-halogen secondary cell comprising the molten sodium negative electrode and a pumping mechanism, wherein the cell is in the process of being recharged.

Referring now to FIGS. 1A and 2A, additional embodiments of the cell 10 are described. FIGS. 1A and 2A are similar to the embodiments shown in FIGS. 1 and 2 respectively; however, FIGS. 1A and 2A comprise additional components. (FIG. 1A shows the discharging of the cell 10 while FIG. 2A shows the charging of the cell 10.) Specifically, FIGS. 1A and 2A show a representative embodiment in which the sodium-halogen secondary cell 10 comprises a negative electrode compartment 15 that includes a sodium-based negative electrode 20, a positive electrode compartment 25 that comprises a current collector 30 that is disposed in a liquid positive electrode solution 35, a sodium ion conductive electrolyte membrane 40 that separates the negative electrode from the positive electrode solution, a first terminal 45, a second terminal 50, an external reservoir 55 that houses the positive electrode solution, and a pumping mechanism 60 that is configured to force the positive electrode solution to flow from the reservoir and past the current collector in the positive electrode compartment.

Figure 7A:
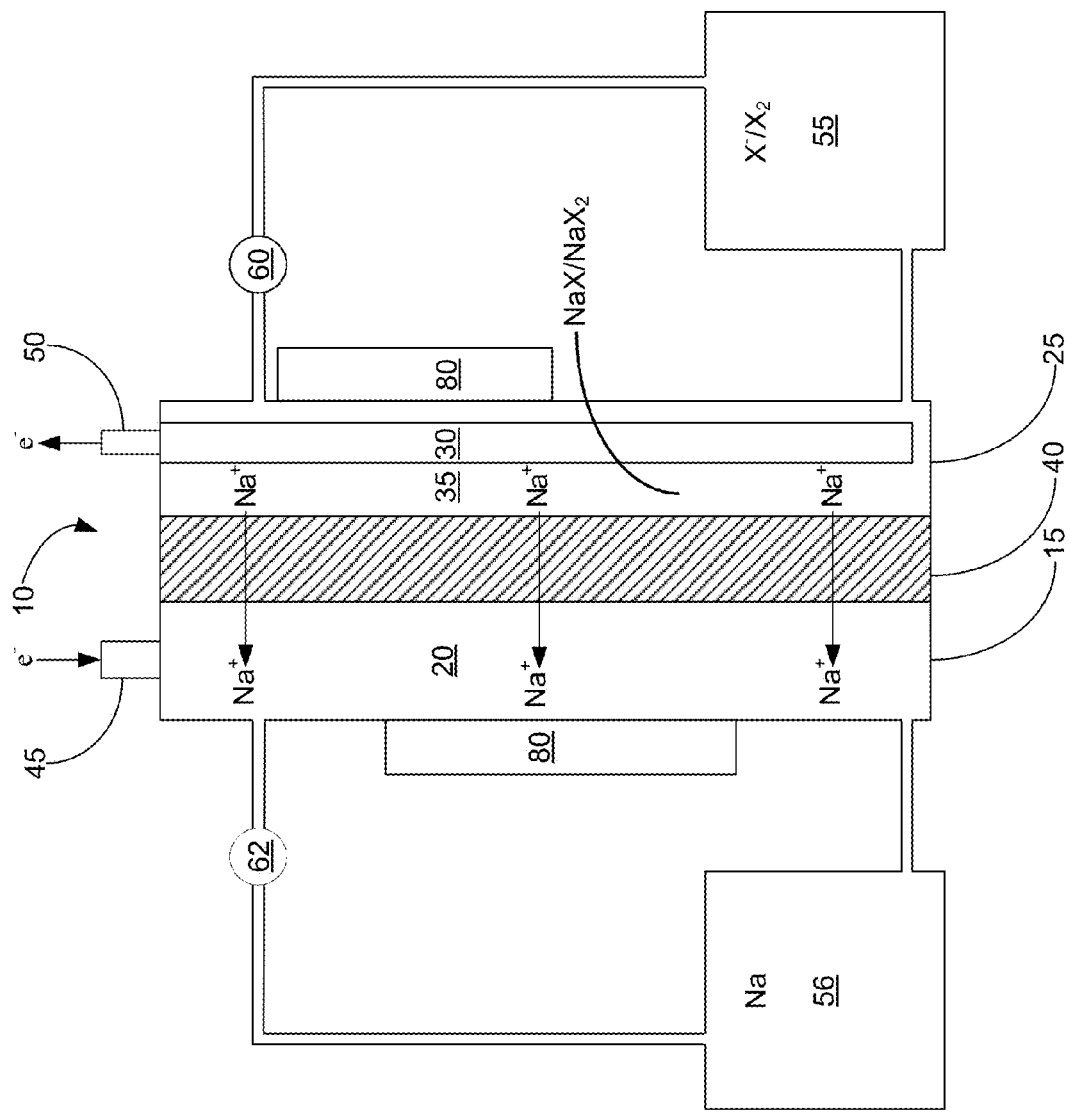
FIG. 7A depicts a schematic diagram of a representative embodiment of the sodium-halogen secondary cell with a pumping mechanism, wherein the cell is configured to cause the positive electrode solution to flow through the positive electrode compartment and to cause the negative electrode to flow through a negative electrode compartment of the cell.

Now, referring to the pumping mechanism 60, the cell 10 can comprise any suitable pumping mechanism that is capable of forcing fluids to flow from a reservoir 55 and into the cell. Indeed, FIG. 7A shows that in some embodiments, the cell 10 is connected to a first reservoir 55 and pumping mechanism 60 that is configured to pump the positive electrode solution 35 from the reservoir and past the current collector 30 in the positive electrode compartment 25. In some embodiments (as also shown in FIG. 7A), the cell 10 is also connected to a second reservoir 56 and a second pumping mechanism 62. In such embodiments, the second pumping mechanism can comprise any suitable pump that is capable of forcing liquids from the second reservoir 56 (e.g., molten sodium, the non-aqueous anolyte 65, a secondary anolyte, etc.) to flow through the negative electrode compartment 15. While a pumping mechanism that forces fluids through the negative compartment can provide the cell with several beneficial characteristics, in some embodiments, such a configuration reduces the total amount of sodium in the negative electrode compartment at any time, and thereby reduces the damage and/or danger that could occur if the positive electrode solution 35 were to contact the negative electrode 20. Additionally, in some embodiments, by pumping the positive electrode solution through the positive electrode compartment, the cell can limit the amount of positive electrode solution that is in the cell and, can thereby limit or control the amount of halogen that is present in the cell.

Where the cell 10 is connected to one or more pumping mechanisms (e.g., 60 and 62) and/or reservoirs (e.g., 55 and 56), the pumping mechanisms can be configured to force fluids through the cell (e.g., the positive electrode compartment 25 and/or the negative electrode compartment 15) at any suitable rate that allows the cell to function as intended. In this regard, the specific flow rates of the various embodiments of the cell will depend on the solubility of the various species in the positive electrode solution 35, the components of the negative electrode compartment 15, and/or upon the cells' intended charge and/or discharge rates.

Figure 4A:
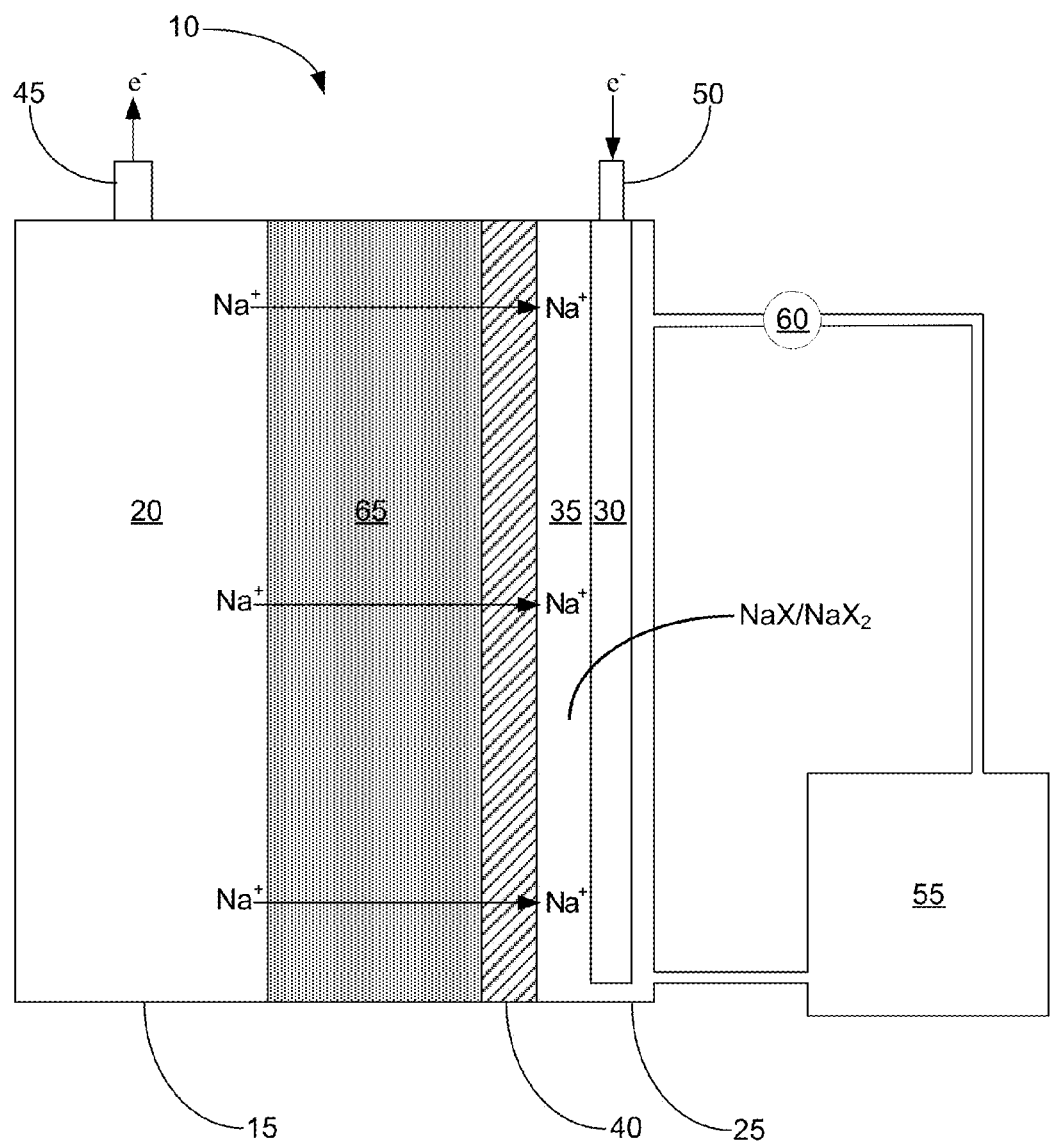
FIG. 4A depicts a schematic diagram of a representative embodiment of the sodium-halogen secondary cell, wherein the cell comprises a solid negative electrode, a pumping mechanism and a non-aqueous anolyte solution disposed between the negative electrode and a solid sodium conductive electrolyte membrane.
Figure 6A:
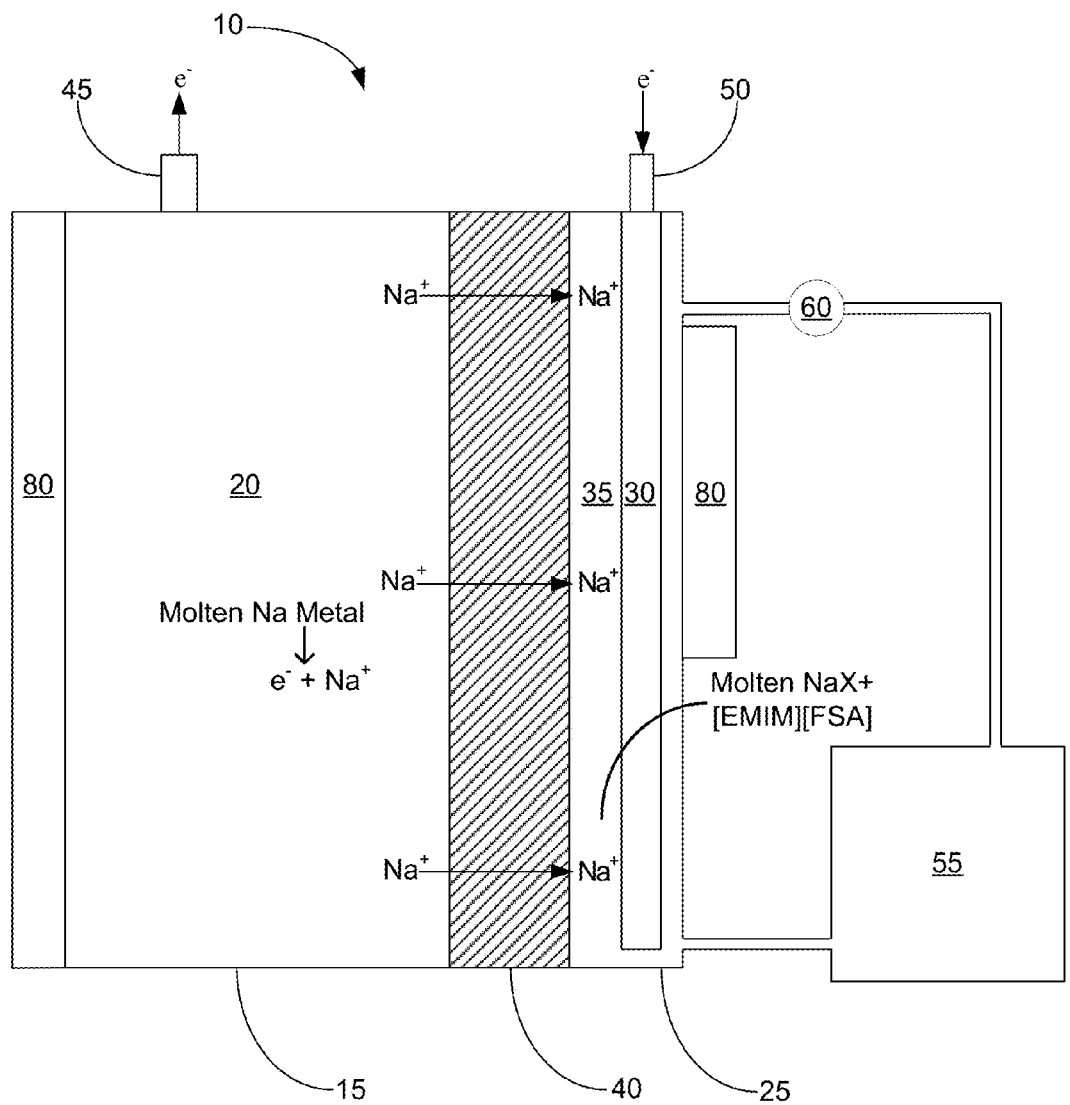
FIG. 6A depicts a schematic diagram of a representative embodiment of the sodium-halogen secondary cell with a pumping mechanism, wherein a positive electrode solution in the cell comprises a molten sodium halide and a molten sodium fluourosulfonyl amide.

It should be noted that the pumping mechanisms (e.g., 60 and 62) and/or reservoirs (e.g., 55 and 56) may be added to other embodiments, in addition to that which is shown in FIGS. 1A, 2A, and 7A. For example, FIG. 4A shows an embodiment of a cell 10 that is similar to that which is described in connection with FIG. 4. However, in the embodiment of FIG. 4A, the pumping mechanism 60 and the reservoir 55 have been added to the cell 10 to pump the positive electrode solution 35 so that it contacts the electrode 30. Likewise, with respect to FIG. 6A, this cell 10 is similar that which is shown in FIG. 6, but that this cell 10 includes a pumping mechanism 60 and the reservoir 55 have been added to the cell 10 to pump the positive electrode solution 35 so that it contacts the electrode 30. Further, it should also be noted that the embodiment of FIG. 7A could also be constructed in which one or more of the pumping mechanisms 60, 62 and/or one or more of the reservoirs 55, 56 are removed.

In another example, while the negative electrode compartment 15 and the positive electrode compartment 25 can be any suitable size, FIGS. 1A, 2A, 3A and 4A, 6A and 7A show that, in at least some embodiments, the positive electrode compartment 25 is relatively small, such that a significant portion of the positive electrode solution 35 is stored outside of the positive electrode compartment (e.g., in one or more external reservoirs 55 that are configured to hold a portion of the positive electrode solution). While such a configuration can provide the cell 10 with a variety of features, in some embodiments, by having a relatively small positive electrode compartment, the cell allows a relatively small amount of the positive electrode solution to be in the positive electrode compartment, and can, thereby, allow a relatively large portion of the positive electrode solution in the positive electrode compartment to be in contact with the current collector 30.

In addition to the aforementioned components, the cell 10 can optionally comprise any other suitable component and characteristic. By way of non-limiting illustration FIG. 6 shows that some embodiments of the cell 10 comprise one or more heat management systems 80. In such embodiments, the cell can comprise any suitable type of heat management system that is capable of maintaining the cell within a suitable operating temperature range. Some examples of such heat management systems include, but are not limited to, a heater, a heat exchanger, a cooler, one or more temperature sensors, and/or appropriate temperature control circuitry.

As still another example of another suitable component that can be used with the cell 10, some embodiments of the cell comprise one or more collectors (not shown) between the reservoir 55 and the positive electrolyte compartment 25. While such collectors can perform any suitable function, in some embodiments, the collectors are used to collect halogens (e.g., bromine, iodine, etc.) from the liquid positive electrode solution 35 as the solution flows through the collectors.

In still another example, the cell 10 can be modified in any suitable manner that allows it to accommodate the transfer of sodium from the negative electrode compartment 15 to the positive electrode compartment 25 during discharge. In this regard, some embodiments of the described cell 10 comprise a volume compensating cell casing (not shown).

In another example, the positive electrode solution 35 can comprise any other suitable ingredient that allows the cell 10 to function as described herein. Indeed, in some embodiments, the positive electrode solution comprises carbon (e.g., ground carbon, a carbon containing material, etc.), and/or any other material that allows the solution to be sodium conductive and to be chemically compatible with the electrolyte membrane 40 and the current collector 30.

In yet another example, the cell 10 can be modified in any suitable manner that allows the safety of the cell to be improved while still allowing the cell to function as intended. Indeed, in some embodiments, the cell comprises one or more pressure relief values (not shown). In other embodiments, the cell comprises one or more protective outer covers. In still other embodiments, the cell is divided into 2 or more smaller cells to reduce any dangers that can be associated with a cell that is damaged or malfunctioning. In yet other embodiments, in addition to the electrolyte membrane 40, the cell comprises one or more additional separators between the negative electrode 20 and the positive electrode solution 35 to minimize the possible exposure that can occur between the negative electrode and the positive electrode solution if the electrolyte membrane becomes damaged.

In still another example of how the cell 10 can be modified, some embodiments of the cell include a pressure management system that is configured to control pressure in a portion of the cell, including without limitation, the positive electrode compartment 25 and/or the negative electrode compartment 15. While this pressure management system can perform any suitable function, in some embodiments, it helps maintain a sufficiently high pressure in the positive electrode compartment to retain halogens in solution such that the halogens can chemically react with other chemical species (e.g., excess sodium halides, excess elemental halogen, one or more complexing agents, metal ions from the current collector 30, etc.) in the positive electrode solution 35.

Figure 3A:
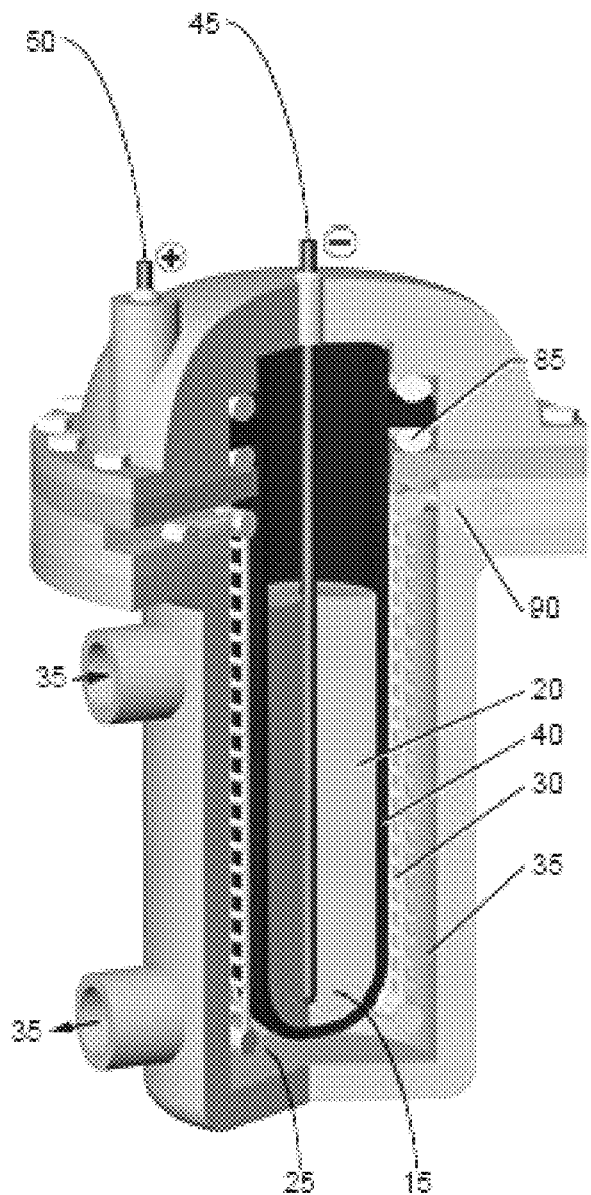
FIG. 3A depicts a cross-sectional perspective view of another representative embodiment of a sodium-halogen secondary cell, wherein the cell comprises a tubular design in which a negative electrode compartment is at least partially disposed within a positive electrode compartment of the cell.

In addition to the aforementioned benefits of the cell 10, the described cell may have several other beneficial characteristics. By way of example, by being able to operate in a temperature range below about 150° C., the cell 10 may operate at significantly lower operating temperatures than some conventional molten sodium rechargeable batteries. Accordingly, the described cell may require less energy to heat and/or dissipate heat from the cell as the cell functions, may be less dangerous use or handle, and may be more environmentally friendly. Additionally, while some conventional sodium rechargeable batteries that operate at relatively high temperatures require relatively expensive construction materials (e.g., metal or ceramic components, glass seals, and/or thermal expansion-matched components), some embodiments of the described cell can be created using less-expensive materials (e.g., polymeric materials, epoxies, epoxies and/or plastic mechanical sealing components, such as the O-rings 85, caps 90, tube flanges 92, etc. shown in FIG. 3). FIG. 3A shows another embodiment of a cell 10 having a tubular design in which one compartment (e.g., the negative electrode compartment 15) is disposed, at least partially, within the other compartment (e.g., the positive electrode compartment 25), while the contents of the two compartments remain separated by the electrolyte membrane 40 and any other compartmental walls.

In another example, some embodiments of the described cell 10 are capable of maintaining themselves at a suitable operating temperature through Joule heating. As a result, such cells may allow for relatively high efficiencies, as additional energy may not be required to maintain such cells at high operating temperatures.

In another example, some embodiments of the described cell 10 have a relatively high theoretical cell voltage (e.g., between about 3.23V and about 3.79V), when compared to some competing conventional batteries (e.g., to some Na/S batteries that have a theoretical voltage of about 2.07V and some $Zn/Br_2$ batteries that have a theoretical voltage of about 1.85V). Additionally, some embodiments of the described cell have a relatively high theoretical specific energy (e.g., about 987 Wh/kg for a $NaBr/Br_2$ cell and about 581 Wh/kg for a $NaI/I_2$ cell) when compared with some competing cells (e.g., some Na/S rechargeable batteries that have a theoretical specific energy of about 755 Wh/kg or some conventional $Zn/Br_2$ rechargeable batteries that have a theoretical specific energy of about 429 Wh/kg). Similarly, some embodiments of the described cell have relatively high practical specific energies (e.g., between about 330 and about 440 for some NaBr/ $Br_2$ embodiments the cell) when compared to some competing conventional batteries (e.g., some Na/S batteries having a practical specific energy between about 150 and about 240 Wh/kg and some $Zn/Br_2$ batteries that have a practical specific energy of about 65 Wh/kg).

As a result of the relatively high voltage and specific energies associated with some embodiments of the described cell 10, fewer of such embodiments may be needed to achieve the same voltages and specific energies that are obtained by competing conventional batteries. In this regard, using fewer cells can reduce the amount of cell interconnect hardware and charge-control circuitry that is required to obtain a desired voltage and target specific energy. Thus, some embodiments of the described cells can reduce overall battery complexity and total cost through the elimination of cells, interconnect hardware, and charge control circuitry. Additionally, as a result of the cells' relatively high capacities and voltages, such cells may be useful for a wide variety of applications, including, without limitation, in grid-scale electrical energy storage systems and in electrical vehicles.

In still another example of a beneficial characteristic, some embodiments of the described cell 10 may have relative long cycle lives when compared to some competing batteries (e.g., about 5,000 deep cycles for some NaBr/Br$_2$ embodiments of the cell, as opposed to about 4,000 cycles for some Na/S batteries and about 2,000 for some Zn/Br$_2$ batteries). Additionally, as some embodiments of the described cell are capable of the extensive utilization of sodium and a halogen during cycling, the discharge/charge cycles of such embodiments can be relatively deep (e.g., having a high SOC (state of charge) and DOD (depth of discharge) of between about 70% and about 80%) compared to some conventional batteries.

In still another example, some embodiments of the described cell 10 produce relatively high currents (and hence power) because of the high mobility of sodium ions through the electrolyte membrane 40 (e.g., a fully dense NaSICON-type material on a porous support) and the relatively fast kinetics of the redox reactions—especially at the low and intermediate temperatures described herein (e.g., ambient temperature to about 150° C.).

Figure 14:
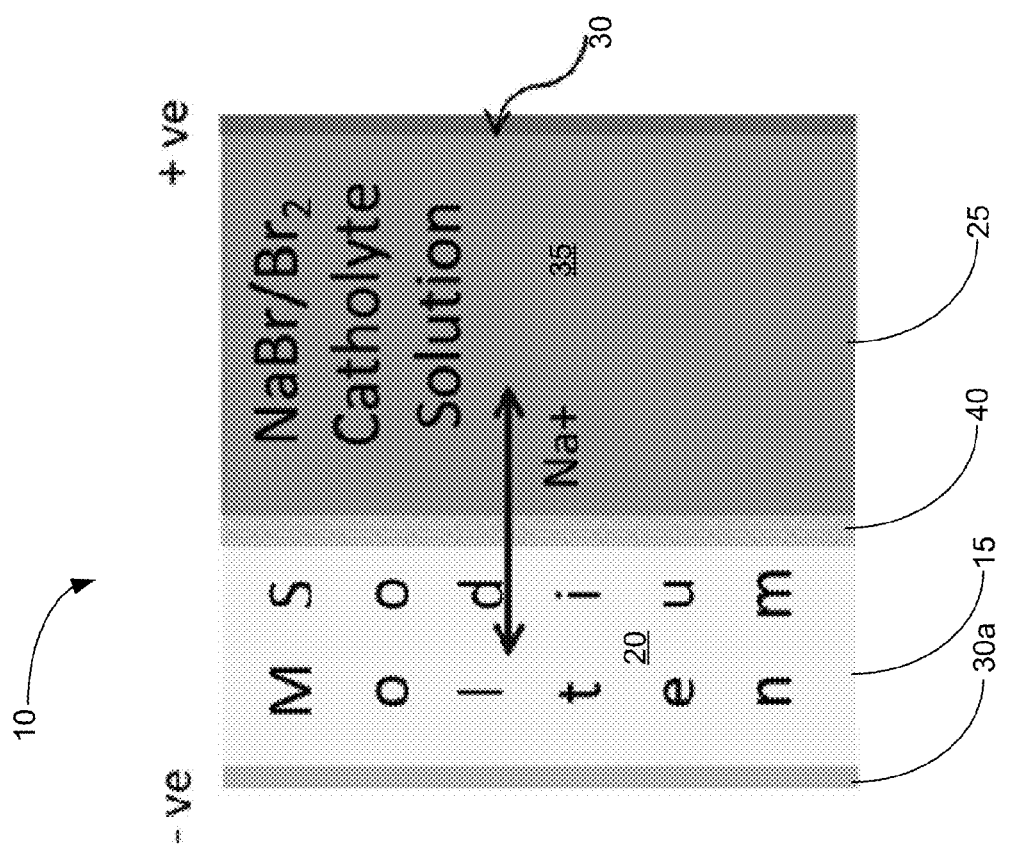
FIG. 14 is a schematic drawing of another cell according to the present disclosure.

Referring now to FIG. 14, a further embodiment of a cell 10 is illustrated. The present embodiments include a sodium ion conductive electrolyte membrane 40, such as a NaSICON membrane that is sold under the NaSELECT trademark by Ceramatec, Inc. of Salt Lake City, Utah. The cell 10 also includes a sodium-based negative electrode 20, which in the embodiment of FIG. 14, comprises sodium metal. The negative electrode is housed within the negative electrode compartment 15. The sodium ions are respectively transported from the negative electrode 20 to the positive electrode compartment 25 through the sodium ion conductive electrolyte membrane 40. A current collector 30a may also be used in the negative electrode compartment 15, as desired. Those skilled in the art will appreciate the particular types of materials that may be used for the current collector 30a.

The positive electrode compartment 25 includes a current collector 30, which in this case may be a carbon current collector, although other types of materials (such as metals) may be used. A liquid positive electrode solution 35 is also housed in the positive electrode compartment 25. In the embodiment of FIG. 14, this solution comprises a mixture of NaBr/Br$_2$ in a solvent. Of course, other types of halogen/halide containing materials may also be used.

In the embodiment of FIG. 14, the cell 10 is constructed with molten sodium anode and an aqueous or non-aqueous bromine cathode. This battery has a theoretical voltage of 3.79 V. Since the melting point of Na metal is about 100° C., this battery may operate above 110° C. and preferably at or above 120° C. The catholyte for this embodiment may be formulated with excess sodium bromide along with elemental bromine resulting in the formation of sodium polyhalides, such as Br$_3^-$. These species have lower vapor pressure but are electroactive similar to bromine. (Of course, although bromine is illustrated as the halide material, other types of halides may be used.)

The embodiment of FIG. 14 may have specific advantages. For example, one of the potential applications for this embodiment invention is to use the cell as large-scale secondary batteries, e.g. grid scale Energy Storage Systems (ESS) and Electric Vehicle (EV) markets. Further, the membrane 40 may have a room-temperature conductivity in the range of $5 \times 10^{-3}$ S/cm. Further, the NaSICON membrane may be completely insensitive to moisture and other common solvents (e.g., methanol).

With respect to FIG. 14, an additional embodiment may be constructed in which the liquid positive electrode solution 35 includes an added species that forms an adduct with the bromine and/or polybromides, such as the bromide-amine adducts. The following is an example of tetramethyl ammonium bromide acting as a complexing agent:

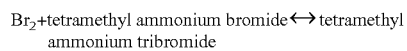
Br$_2$+tetramethyl ammonium bromide ⇌ tetramethyl ammonium tribromide In one embodiment, the membrane is a NaSICON tubes that allows the battery system to be pressurized. Pressure could be used to keep the bromine in solution form.

Figure 15:
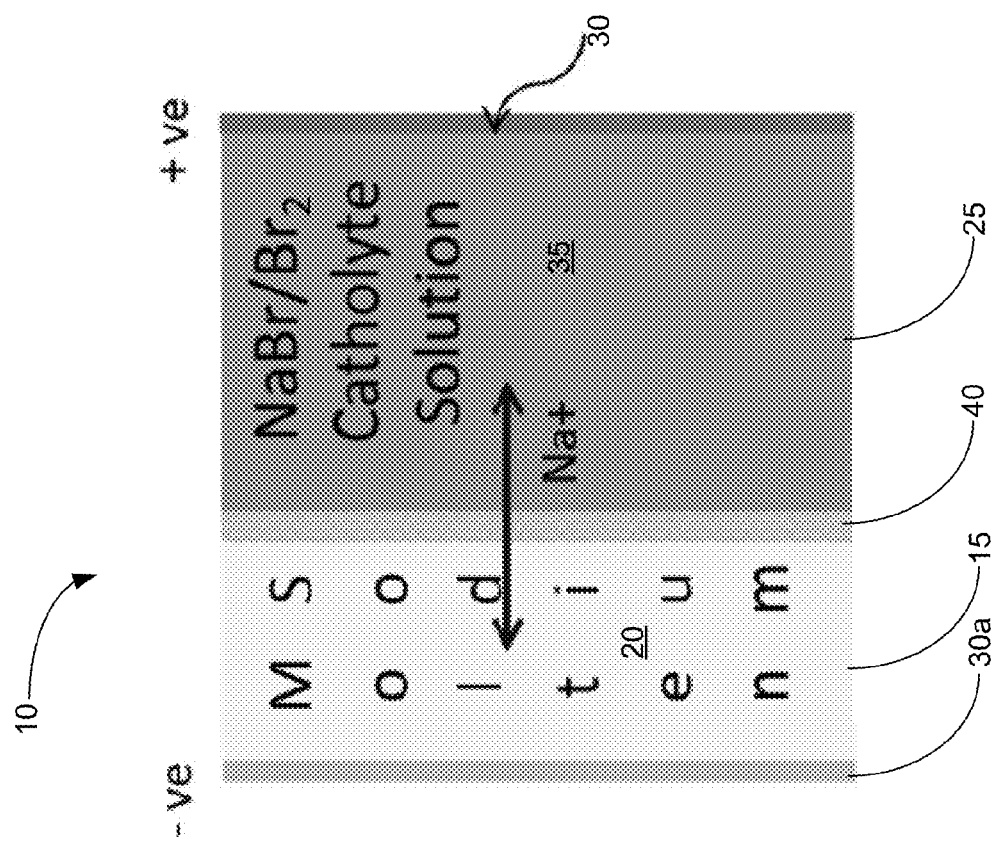
FIG. 15 is a schematic drawing of another cell according to the present disclosure.

Referring now to FIG. 15, another embodiment of a cell 10 is illustrated. This embodiment of the cell 10 is similar to that which was shown in FIG. 14. However, in the embodiment of FIG. 15, the cell 10 circumvents the generation of bromine by utilizing a metal current collector 30 that forms the corresponding bromide. The following are the cathode half-cell reactions:

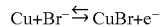
Cu+Br$^-$ ⇌ CuBr+e$^-$

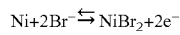
Ni+2Br$^-$ ⇌ NiBr$_2$+2e$^-$

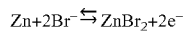
Zn+2Br$^-$ ⇌ ZnBr$_2$+2e$^-$

An example of a full cell reaction is:

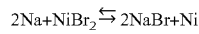
2Na+NiBr$_2$ ⇌ 2NaBr+Ni

This cell 10 relies on oxidation of the metal before the oxidation of bromide ion to bromine so the result is the formation of non-volatile metal bromide. The voltages for these batteries may be 2.57, 2.61 and 2 volts respectively for Cu, Ni and Zn. The battery may include a bromide or bromine electrode, a complexing agent, and an aqueous or non-aqueous solvent at 120° C. The battery may have a NaSICON membrane that is stable in these conditions.

Figure 16:
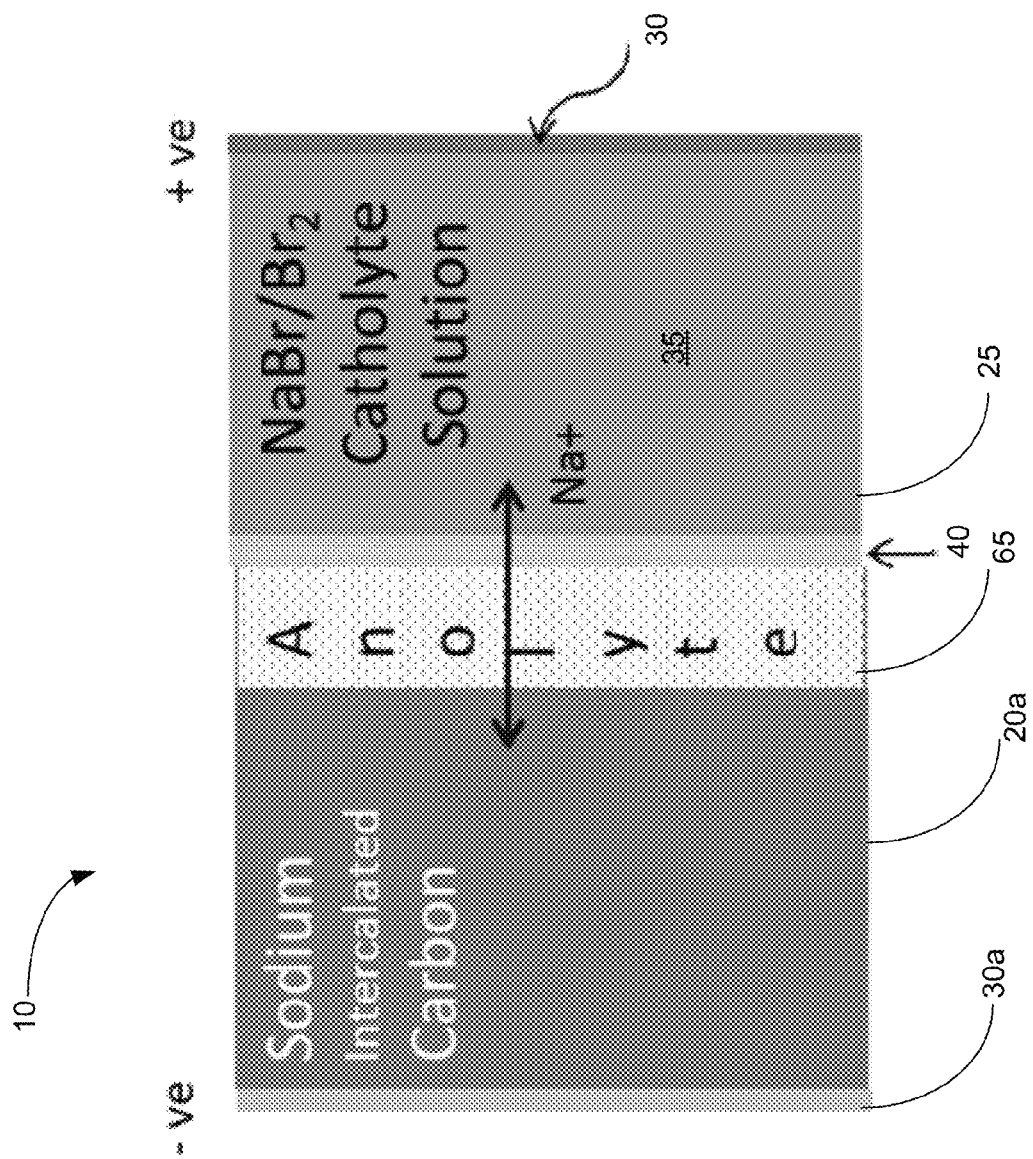
FIG. 16 is a schematic drawing of another cell according to the present disclosure.

Referring now to FIG. 16, a further embodiment of a cell 10 is illustrated. In the embodiment of FIG. 16, the cell 10 may include a solid sodium anode. However, as shown in FIG. 15, the cell 10 includes a sodium intercalating carbon anode 20a. The positive electrode compartment 25 comprises an aqueous or non-aqueous bromine or bromide solution that is used as the liquid positive electrode solution 35. The anolyte 60 is positioned adjacent the membrane 40 (which may be a NaSICON membrane).

The cell 10 of FIG. 16 may be operated at ambient to 60° C., where the elemental bromine can be effectively complexed (e.g. N-methyl-N-methylmorpholinium bromide) such that the free bromine can be reduced by greater than 100-fold. Other complexing agents that can complex bromine effectively at ambient temperature can be used. (MEMBr may be used in a zinc-bromine system.) In one embodiment, this cell 10 utilizes the non-aqueous anolyte 65 in-between the sodium intercalating carbon and the NaSICON membrane 40.

One particular embodiment of the cell 10 shown in FIG. 16 uses bromide or bromide as the halogen/halide material in the positive electrode compartment 25. This aqueous or non-aqueous solvent with a NaSICON membrane that is stable at ambient temperature. The cell 10 may be capable of the reversible plating of Na and have a bromine cathode. The battery may operate with at least twenty five reversible cycles at practical C-rates (C/5) and practical Depth of Discharge (DOD≥50%).

Figure 17:
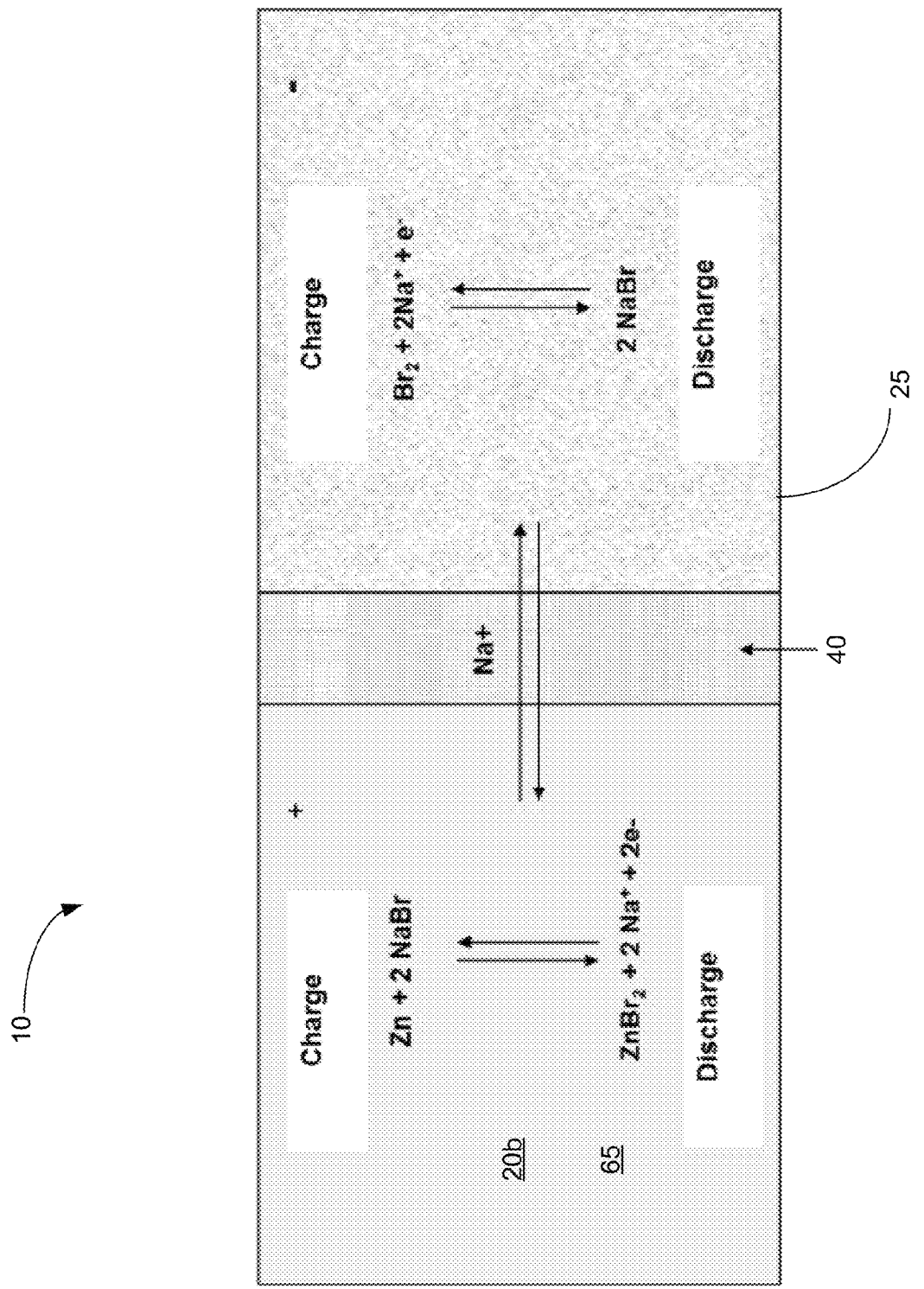
FIG. 17 is a schematic drawing of another cell according to the present disclosure.

Referring now to FIG. 17, an additional embodiment of a cell 10 is illustrated. This cell uses Zn negative electrode 20b and a positive electrode. (A current collector is used in the positive electrode compartment 25, but this feature is not shown in FIG. 17.) The cell 10 uses a dense NaSICON membrane 40 that is sodium ion selective and water impervious. The anolyte 65 and the liquid positive electrode solution 35 may be sodium bromide based solutions and not zinc bromide solutions.

In this cell 10, the Zn anode 20b will be placed in an aqueous solution containing sodium bromide (or another solution of alkali metal ions and halide ions). The anode shown in this Figure is Zn, but other metals may also be used. The liquid positive electrode solution 35 (catholyte) will be a bromine/sodium bromide solution with a graphite current collector. During discharge, Zn will oxidize to form Zinc bromide and the sodium ions will be transported to the cathode current collector where they react with bromine to form sodium bromide. During charge, Zn will redeposit and bromine is regenerated. The advantages of this cell 10 compared to a microporous type battery are:
 (1) The composition of the anolyte can be adjusted to allow reversible deposition of Zn. In fact, the anolyte can be a mixture of NaBr and NaOH so that no zinc dendrites can be formed resulting in loss of capacity;
 (2) No self-discharge because the bromine from catholyte will never come into contact with the zinc metal;
 (3) Unique electrolyte chemistries may be employed to circumvent the need for flow of the anolyte and catholyte;
 (4) Other lower reduction potential elements such as Mg can be used if a nonaqueous solvent are used resulting in a higher voltage battery.

The cell 10 of this embodiment will have a Zn anode in sodium bromide and/or sodium hydroxide solution in a NaSICON based cell and will be capable of reversible deposition. The NaSICON membrane in this battery will be stable in the presence of bromide/bromine/complexing agent/aqueous or non-aqueous solvent at ambient temperature.

The cell 10 may be configured to have reversible $NaBr/Br_2$ cathode operation at ambient temperature. This cell 10 may have at least twenty five reversible cycles at practical C-rates (C/5) and practical Depth of Discharge (DOD≥50%) in a stagnant battery with Zn anode and $NaBr/Br_2$ cathode.

EXAMPLES

The following examples are given to illustrate various embodiments within, and aspects of, the scope of the present invention. The examples are given by way of example only, and it is understood that the following examples are not comprehensive or exhaustive of the many types of embodiments that can be prepared.

Example 1

Figure 8:
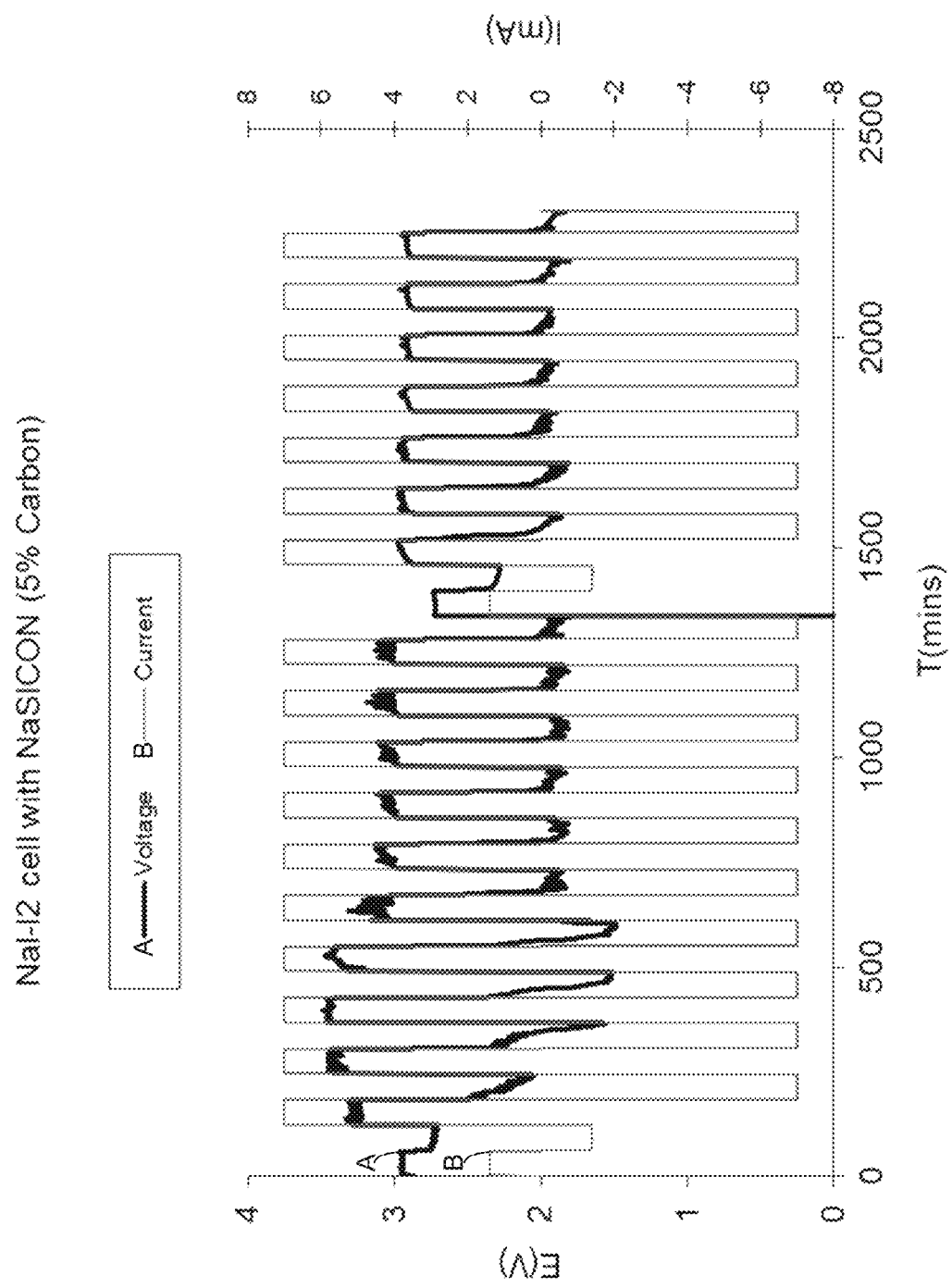
FIGS. 8-13 each depict a graph showing experimental results obtained from a test run of representative embodiments of an experimental cell.

In one example, a cell 10 was set up to include a molten sodium negative electrode 20, a platinum mesh current collector 30, a positive electrode solution comprising 20 wt % NaI in formamide with a 1:3 molar ratio of $I_2$ to NaI+5 wt % carbon from the formamide as the positive electrode. In this example, after operating at a temperature up to about 120° C. for over 2,000 minutes, the cell had the performance characteristics shown in FIG. 8. Specifically, FIG. 8 shows that the cell had relatively noisy charge/discharge curves, as well as some large overpotentials. In this regard, it is believed that these noisy curves and overpotentials may have resulted from the use of formamide, because the formamide only dissolved the NaI and did not dissolve the iodine, the formamide created gas bubbles, and because the formamide is less conductive than other suitable solvents that can be present in the positive electrode solution 35. Nevertheless, FIG. 8 showed that at least some embodiments of the described $NaI/NaI_2$ cell are feasible.

Example 2

Figure 9:
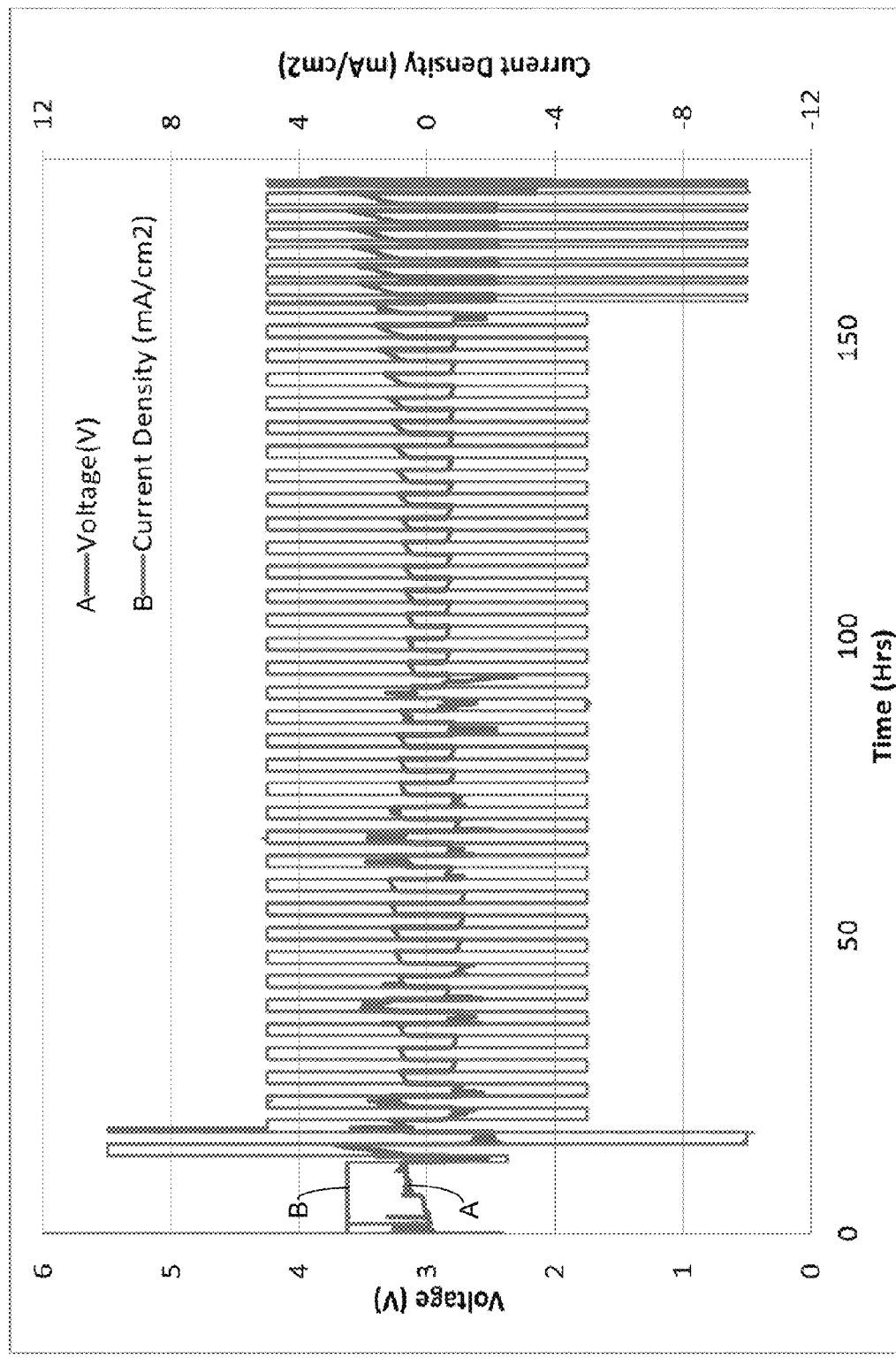

In a second example, a cell 10 was set up to include a molten sodium negative electrode 20, a platinum mesh current collector 30, a positive electrode solution comprising up to about 25 wt % NaI and more than about 75% DMSO, with a NaSICON-type membrane having a current density of between 5 mA/cm² and 10 mA/cm². In this example, after operating at a temperature up to about 120° C. for over 150 hours, the cell had the performance characteristics shown in FIG. 9. Specifically, the performance characteristics in FIG. 9 show that the cell of this example had lower overpotentials than the cell in the earlier example. In this regard, it is believed that the DMSO solution was more conductive than the formamide, and thereby provided the cell with lower overpotentials. Also, in this experiment, it was apparent that the DMSO dissolved the NaI and the iodine. Moreover, it is believed that the DMSO has a stable electrochemical window that allowed this cell to operate better than the cell in Example 1. Accordingly, it appears from this example, that DMSO is a better solvent for use in at least some embodiments of the cell than is formamide.

Example 3

Figure 10:
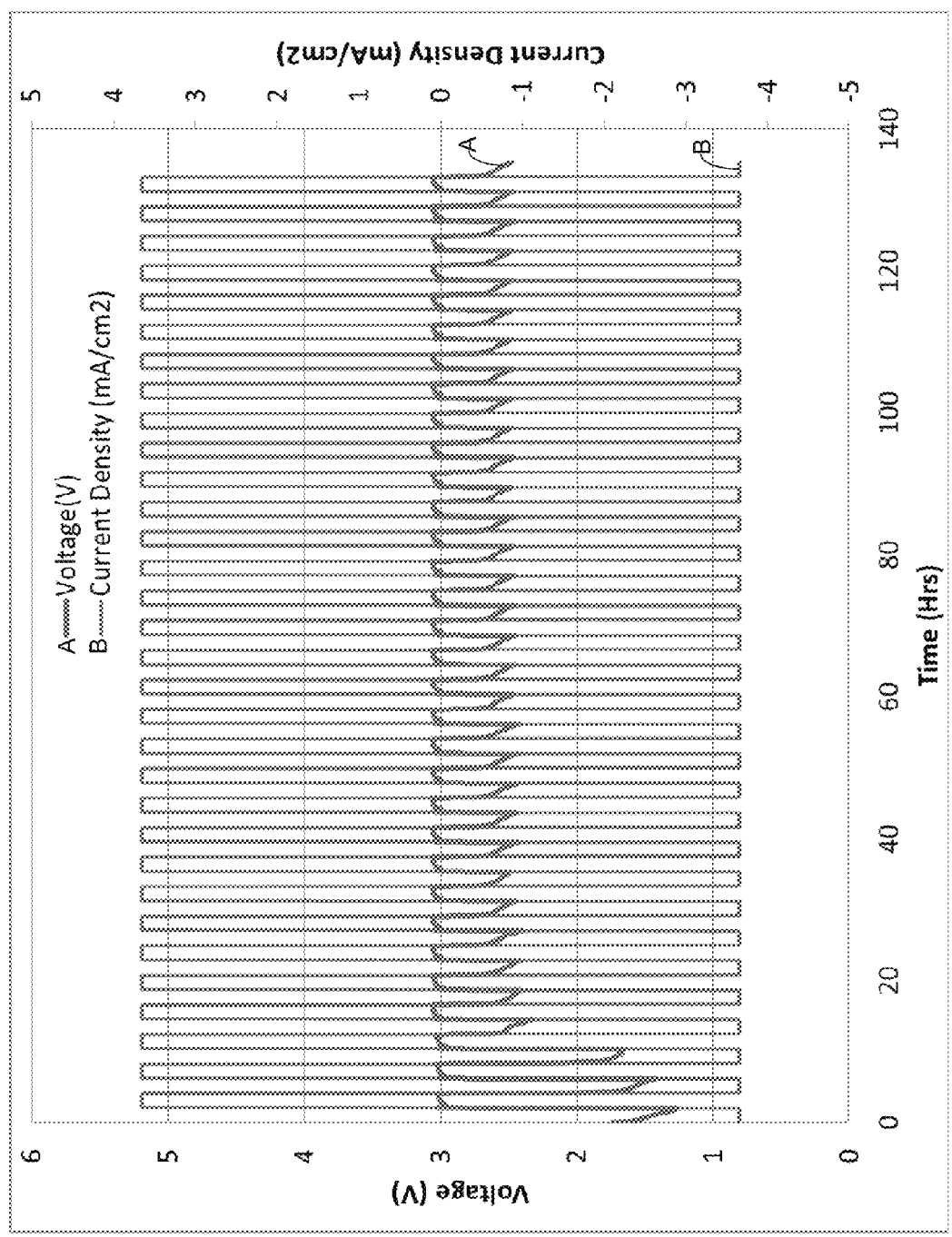
Figure 11:
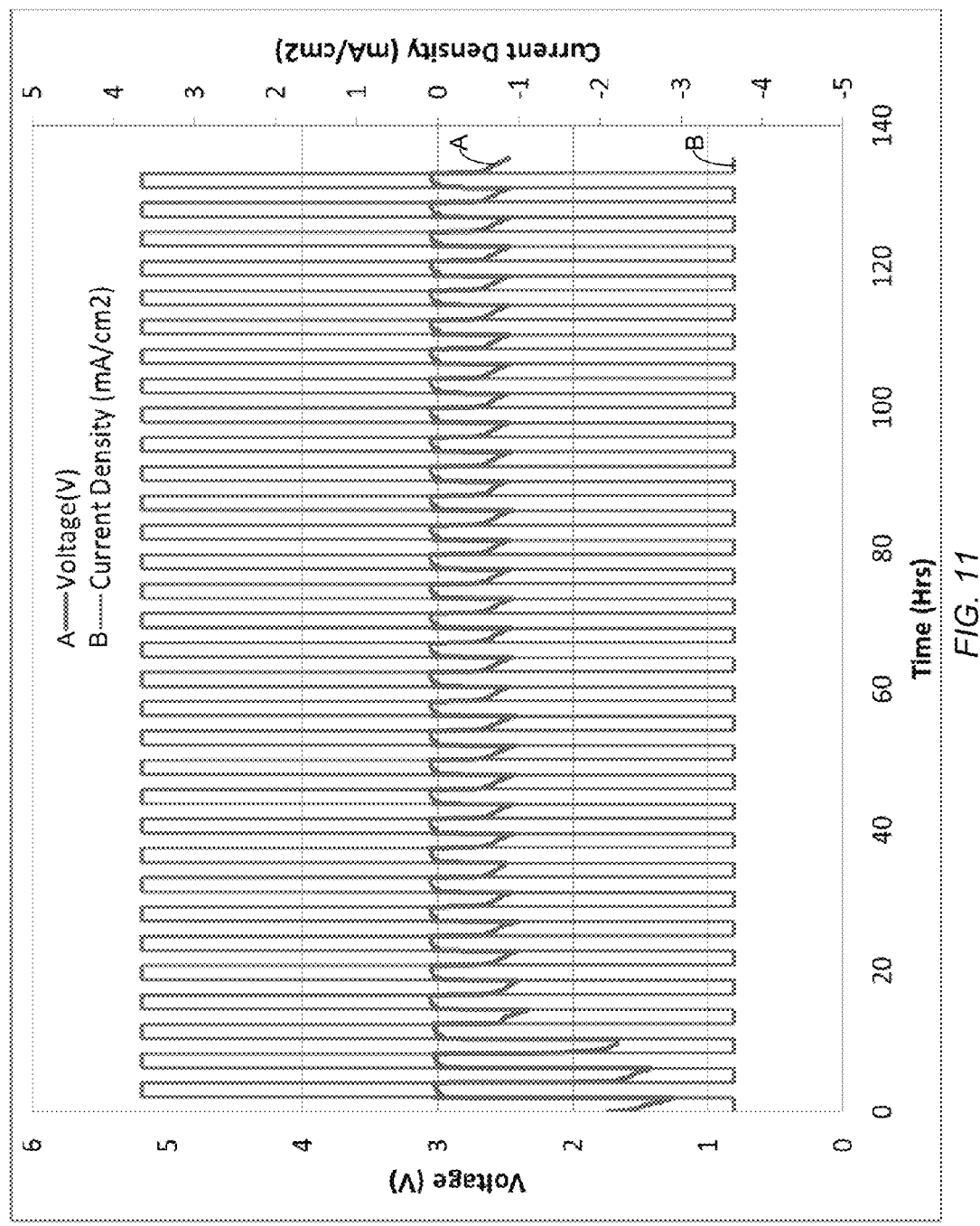
Figure 12:
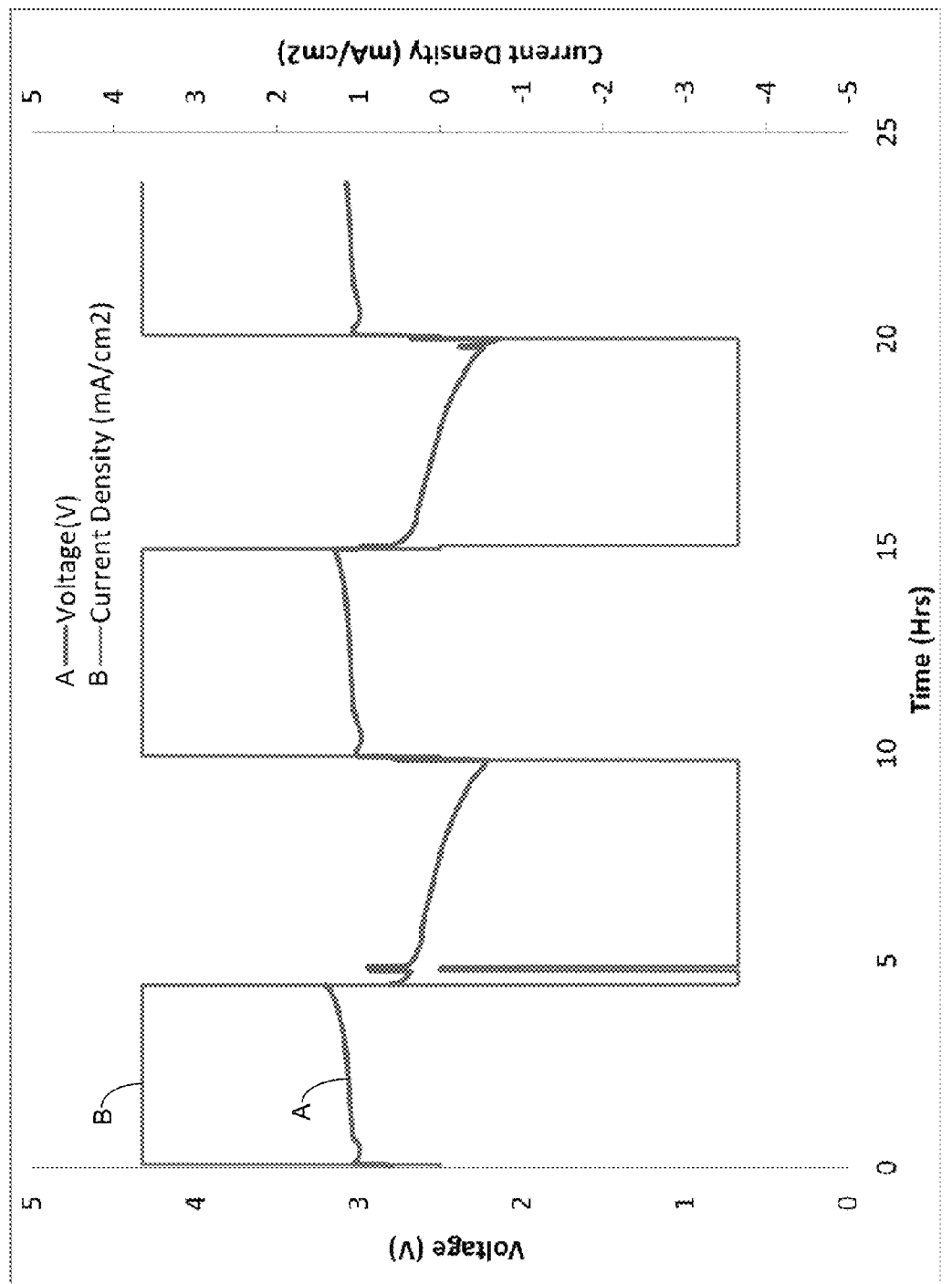

In a third example, a first large cell was set up to include an electrolyte membrane 40 having a current density of about 3.65 mA/cm² and having approximately 4 times the surface area of the membranes used in the first two examples, a molten sodium negative electrode 20, a platinum mesh current collector 30, and a positive electrode solution 35 comprising up to about 25 wt % NaI and more than about 75 wt % formamide with 0.5 moles of $I_2$ per mole of NaI. Additionally, a second large cell was set up to include an electrolyte membrane 40 having a current density of about 3.65 mA/cm² and with approximately 4 times the surface area of the membranes used in the first two examples, a molten sodium negative electrode 20, a platinum mesh current collector 30, a positive electrode solution 35 comprising up to about 25 wt % NaI and more than about 75 wt % DMSO with 0.5 moles of $I_2$ per mole of NaI. After these two cells were operated at a temperature of up to about 120° C. for more than 120 hours with a depth of discharge of about 20% of the cells' available capacity, the performance characteristics of the first and second cells were gathered and are displayed herein as FIGS. 9 and 10. Specifically, FIGS. 10 and 11 show that the two cells have virtually identical performance characteristics. Additionally, for the second cell in this example, FIG. 12 shows some performance characteristics for the cell when the cell was operated at a depth of discharge of 50% of the cell's available capacity. In this regard, FIG. 12 shows the feasibility of operating such a cell with relatively deep discharge cycles.

Example 4

Figure 13:
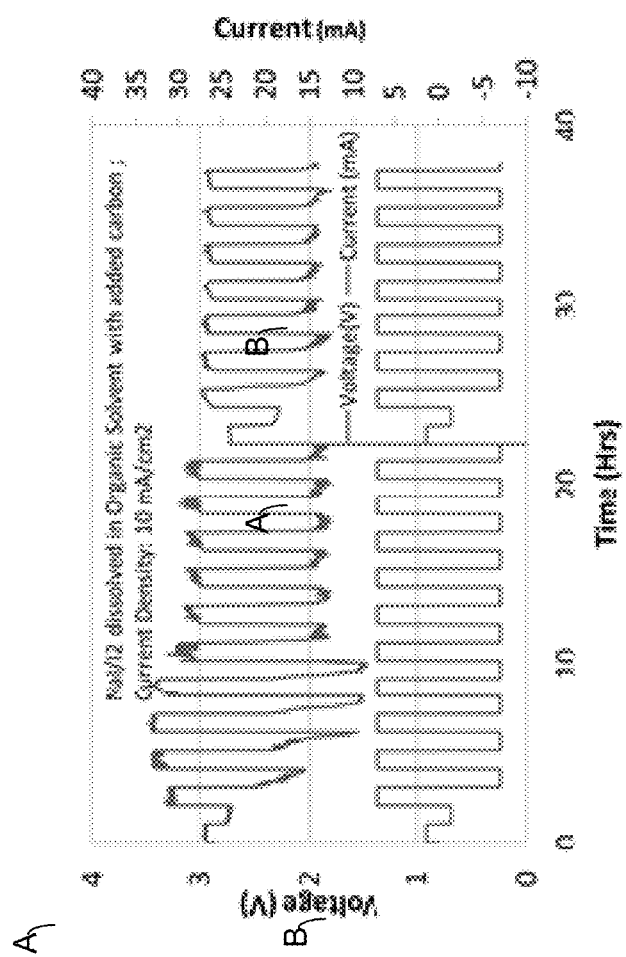

In one example, a cell 10 was set up to include a molten sodium negative electrode 20, an electrolyte membrane 40 comprising a NaSICON-type membrane having a current density of approximately 10 mA/cm², and a positive electrode solution 35 comprising NaI/I$_2$ dissolved in an organic solvent with added carbon. The cell was then operated at about 110° C. for over 30 hours. Some performance characteristics of a test run of this experimental cell are shown in FIG. 13. In this regard, while FIG. 13 shows that the voltage drop in the experimental cell was relatively large, and that there is some noise in the data, FIG. 13, nevertheless, shows the feasibility of a sodium-halogen based system using iodine.

Thus, the above-recited examples show that a Na-Iodine battery may be implemented that uses DMSO or NMF as the solvent to dissolve the sodium iodide and (at least partially) dissolve the iodine. This system may be capable of deep discharge of about 50% of NaI/Iodine cathode and possibly up to about 70% of NaI/iodine cathode. In some embodiments, a Pt cathode may be replaced with a lower-cost cathode. The membrane used in the cells may be a NaSICON membrane and may have a current density that is greater than or equal to 10 mA/cm$^2$.

The batteries (cells) that are described herein may have significant advantages over other types of batteries. For example, as noted above, many types of known sodium rechargeable batteries must be operated at high temperatures, such as, for example, above 250° C. or even above 270° C. However, as noted herein, the present embodiments may be operated at temperatures below 250° C. In fact, some embodiments may be operated at ambient temperatures, at temperatures less than about 60° C., at temperatures less than about 150° C., less than 200° C., less than 180° C., etc. These temperature ranges for batteries can provide significant benefits as resources do not have to be allocated to heat the batteries to extreme high temperatures (such as 270° C.).

Further, some of the present embodiments may use NaSICON in lieu of sodium β"-alumina ceramic materials as the separator. NaSICON has specific advantages over sodium β"-alumina ceramics as the NaSICON is compatible with water and other solvents. Further, NaSICON can separate the two sides of the cell such that each side may be optimized without worrying that the reactants on one side of the membrane will foul/interfere with the reactants on the other side of the membrane.

All the patent applications and patents listed herein are expressly incorporated herein by reference.

Embodiments of the present invention may be embodied in other specific forms without departing from its spirit or essential characteristics. The described embodiments and examples are to be considered in all respects only as illustrative and not as restrictive. The scope of the invention is, therefore, indicated by the appended claims rather than by the foregoing description. All changes that come within the meaning and range of equivalency of the claims are to be embraced within their scope.

What is claimed is:

1. A sodium-halogen secondary cell, comprising:
   a negative electrode compartment comprising a negative electrode that comprises sodium, wherein the negative electrode electrochemically oxidizes to release sodium ions during discharge and electrochemically reduces sodium ions to form sodium metal during recharge;
   a positive electrode compartment comprising a current collector disposed in a liquid positive electrode solution that comprises at least one of a halogen and a halide; and
   a sodium ion conductive electrolyte membrane that separates the negative electrode from the liquid positive electrode solution.

2. The secondary cell of claim 1, wherein the negative electrode comprises molten sodium metal.

3. The secondary cell of claim 1, wherein the secondary cell is able to operate when a temperature of the negative electrode is below about 150° C.

4. The secondary cell of claim 3, wherein the secondary cell is able to operate when the temperature of the negative electrode is also above about 100° C.

5. The secondary cell of claim 1, wherein the secondary cell is able to operate when a temperature of the negative electrode is below about 250° C.

6. The secondary cell of claim 1, wherein the secondary cell is able to operate when a temperature of the negative electrode is below about 200° C.

7. The secondary cell of claim 1, wherein the secondary cell is able to operate when a temperature of the negative electrode is below about 180° C.

8. The secondary cell of claim 1, wherein the negative electrode comprises a material selected from a sodium metal and a sodium intercalating carbon anode.

9. The secondary cell of claim 8, wherein the negative electrode remains substantially solid as the secondary cell operates.

10. The secondary cell of claim 8, wherein the secondary cell is able to operate when a temperature of the negative electrode is below about 60° C.

11. The secondary cell of claim 8, further comprising a non-aqueous anolyte solution disposed between the negative electrode and the electrolyte membrane.

12. The secondary cell of claim 1, wherein the electrolyte membrane comprises a NaSICON-type material.

13. The secondary cell of claim 12, wherein the NaSICON-type material comprises a composite membrane having a porous layer and a dense functional coating layer.

14. The secondary cell of claim 1, wherein liquid positive electrode solution comprises solvent selected from N-methyl formamide and dimethyl sulfoxide.

15. The secondary cell of claim 1, wherein the liquid positive electrode solution comprises a compound selected from NaBr, NaI, and NaCl.

16. The secondary cell of claim 1, wherein the liquid positive electrode solution comprises a sufficient amount of at least one of the sodium halide and an elemental halogen to form a sodium polyhalide as the secondary cell operates.

17. The secondary cell of claim 1, wherein the liquid positive electrode solution comprises a complexing agent that is capable of forming a complex with at least one of a halogen, the sodium halide, and a polyhalide in the liquid positive electrode solution.

18. The secondary cell of claim 1, wherein the complexing agent comprises a tetramethyl ammonium halide compound.

19. The secondary cell of claim 1, wherein the current collector comprises a metal selected from the group consisting of copper, nickel, zinc, and combinations thereof.

20. The secondary cell of claim 1, further comprising:
   a first reservoir in fluid communication with the positive electrode compartment; and
   a first pumping mechanism configured to cause the liquid positive electrode solution to flow from the first reservoir into the positive electrode compartment and past the current collector.

21. The secondary cell of claim 20, wherein the negative electrode comprises molten sodium metal, wherein the secondary cell further comprises a second fluid reservoir in fluid communication with the negative electrode compartment, and a second pumping mechanism configured to cause the molten sodium metal to flow from the second reservoir into the negative electrode compartment.

22. A molten sodium secondary cell, comprising:
- a negative electrode compartment comprising a sodium metal negative electrode, wherein the sodium metal negative electrode electrochemically oxidizes to release sodium ions during discharge and electrochemically reduces sodium ions to sodium metal during recharge, and wherein the sodium metal negative electrode is molten as the cell operates;
- a positive electrode compartment comprising a current collector disposed in a liquid positive electrode solution that comprises a sodium halide; and
- a sodium ion conductive electrolyte membrane that separates the negative electrode from the liquid positive electrode solution.

23. The secondary cell of claim 22, wherein the secondary cell is able to operate when a temperature of the negative electrode is between about 100° C. and about 150° C.

24. The secondary cell of claim 22, wherein the liquid positive electrode solution comprises a complexing agent.

25. The secondary cell of claim 24, wherein the complexing agent comprises a tetramethyl ammonium halide material.

26. The secondary cell of claim 22, wherein the liquid positive electrode solution comprises a molten sodium halide dissolved in a molten fluorosulfonyl amide.

27. The secondary cell of claim 26, wherein the fluorosulfonyl amide comprises 1-Ethyl-3-methylimidazolium-(bis(fluorosulfonyl) amide.

28. The secondary cell of claim 22, wherein the current collector comprises a sodium intercalation material.

29. The secondary cell of claim 22, further comprising:
- a first reservoir in fluid communication with the positive electrode compartment; and
- a first pumping mechanism configured to cause the liquid positive electrode solution to flow from the first reservoir into the positive electrode compartment and past the current collector.

30. A secondary cell, comprising:
- a negative electrode compartment comprising a negative electrode, wherein the negative electrode comprises a material selected from a sodium metal and a sodium intercalating carbon anode, wherein the negative electrode electrochemically oxidizes to release sodium ions during discharge and electrochemically reduces sodium ions to form sodium metal during recharge, and wherein the negative electrode remains in a substantially solid state as the secondary cell operates;
- a positive electrode compartment comprising a current collector disposed in a liquid positive electrode solution that comprises at least one of a halogen and a halide;
- a sodium ion conductive electrolyte membrane that separates the negative electrode from the liquid positive electrode solution; and
- a non-aqueous anolyte solution disposed between the negative electrode and the electrolyte membrane.

31. The secondary cell of claim 30, wherein the secondary cell is able to operate when a temperature of the negative electrode is below about 60° C.

32. The secondary cell of claim 30, wherein the liquid positive electrode solution comprises a complexing agent.

33. The secondary cell of claim 32, wherein the complexing agent comprises an N-methyl-N-methylmorpholinium halide material.

34. The secondary cell of claim 30, further comprising:
- a reservoir in fluid communication with the positive electrode compartment; and
- a pumping mechanism configured to cause the liquid positive electrode solution to flow from the reservoir into the positive electrode compartment and past the current collector.

35. A halogen-containing secondary cell, comprising:
- a negative electrode compartment comprising a negative electrode that comprises a metal, wherein the negative electrode compartment further comprises a quantity of sodium ions and halide anions;
- a positive electrode compartment comprising a current collector disposed in a liquid positive electrode solution that comprises at least one of a halogen and a halide; and
- a sodium ion conductive electrolyte membrane that separates the negative electrode from the liquid positive electrode solution.

36. The secondary cell of claim 1, wherein the positive electrode solution comprises at least one of an elemental halogen and a sodium halide.

37. The secondary cell of claim 22, wherein the positive electrode solution comprises at least one of an elemental halogen and a sodium halide.

38. The secondary cell of claim 30, wherein the positive electrode solution comprises at least one of an elemental halogen and a sodium halide.

39. The secondary cell of claim 35, wherein the positive electrode solution comprises at least one of an elemental halogen and a sodium halide.

* * * * *